(12) United States Patent
Youn et al.

(10) Patent No.: US 9,985,679 B2
(45) Date of Patent: May 29, 2018

(54) MOBILE TERMINAL

(71) Applicant: LG ELECTRONICS INC., Seoul (KR)

(72) Inventors: Yeomin Youn, Seoul (KR); Jaehyun Choi, Seoul (KR); Jungsun Ahn, Seoul (KR); Changil Kim, Seoul (KR); Kangjae Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 15/783,873

(22) Filed: Oct. 13, 2017

(65) Prior Publication Data

US 2018/0041239 A1 Feb. 8, 2018

Related U.S. Application Data

(63) Continuation of application No. 15/498,210, filed on Apr. 26, 2017, now Pat. No. 9,819,383, which is a
(Continued)

(30) Foreign Application Priority Data

Dec. 3, 2013 (KR) .................. 10-2013-0149413

(51) Int. Cl.
| | |
|---|---|
| *H04M 1/00* | (2006.01) |
| *H04B 1/3888* | (2015.01) |
| *H01Q 1/44* | (2006.01) |
| *G06F 1/20* | (2006.01) |
| *G06F 1/16* | (2006.01) |
| *H04M 1/18* | (2006.01) |

(Continued)

(52) U.S. Cl.
CPC ......... *H04B 1/3888* (2013.01); *G06F 1/1626* (2013.01); *G06F 1/1656* (2013.01); *G06F 1/1698* (2013.01); *G06F 1/203* (2013.01); *H01Q 1/243* (2013.01); *H01Q 1/44* (2013.01); *H01Q 5/30* (2015.01); *H04M 1/0202* (2013.01); *H04M 1/0249* (2013.01); *H04M 1/18* (2013.01); *H04B 2001/3894* (2013.01)

(58) Field of Classification Search
CPC ......... H04B 1/3888; H04B 2001/3894; H04M 1/0202; H04M 1/0249; H04M 1/18
USPC ...................................... 455/575.7
See application file for complete search history.

(56) References Cited

U.S. PATENT DOCUMENTS

| | | | |
|---|---|---|---|
| 8,159,399 B2 * | 4/2012 | Dorsey ............... | H01Q 1/2266 343/702 |
| 8,447,239 B1 * | 5/2013 | Berry .................. | H04B 7/2606 455/106 |

(Continued)

*Primary Examiner* — April G Gonzales
(74) *Attorney, Agent, or Firm* — Lee, Hong, Degerman, Kang & Waimey PC

(57) ABSTRACT

A mobile terminal includes a metal frame including a base portion and an edge portion formed along the outer edge of the base portion, first and second cases bonded to the front and back sides of the metal frame so as to expose the edge portion to the outside, first and second waterproof layers formed between the cases and the metal frame, conductive members that operate a radiator for antennas, together with the edge portion, and are formed on one side of the second case, and feeding portions for feeding the conductive members, the feeding portions being disposed in an enclosed space formed by the waterproof layers.

30 Claims, 15 Drawing Sheets

Related U.S. Application Data continuation of application No. 14/480,149, filed on Sep. 8, 2014, now Pat. No. 9,680,206.

(51) Int. Cl.
*H04M 1/02* (2006.01)
*H01Q 5/30* (2015.01)
*H01Q 1/24* (2006.01)
*H04B 1/38* (2015.01)

(56) References Cited

U.S. PATENT DOCUMENTS

| | | | | |
|---|---|---|---|---|
| 9,667,296 B2* | 5/2017 | Kim | ............. | H01Q 1/243 |
| 2005/0136967 A1* | 6/2005 | Jeon | ............. | G06F 1/203 |
| | | | | 455/550.1 |
| 2009/0115683 A1* | 5/2009 | Kurashima | ............. | H01Q 1/2258 |
| | | | | 343/878 |
| 2009/0140948 A1* | 6/2009 | Yanagi | ............. | H01Q 1/243 |
| | | | | 343/846 |
| 2012/0013510 A1* | 1/2012 | Yagi | ............. | H01Q 1/243 |
| | | | | 343/700 MS |
| 2012/0081875 A1* | 4/2012 | Yamaguchi | ............. | G06F 1/1616 |
| | | | | 361/807 |
| 2012/0182190 A1* | 7/2012 | Yui | ............. | H01Q 1/04 |
| | | | | 343/702 |
| 2012/0190386 A1* | 7/2012 | Anderson | ............. | G01C 15/04 |
| | | | | 455/456.3 |
| 2013/0217451 A1* | 8/2013 | Komiyama | ............. | H04M 1/021 |
| | | | | 455/575.8 |
| 2013/0242478 A1* | 9/2013 | Song | ............. | H05K 5/0239 |
| | | | | 361/679.01 |
| 2013/0267170 A1* | 10/2013 | Chong | ............. | H04B 1/3833 |
| | | | | 455/41.1 |
| 2014/0010545 A1* | 1/2014 | Berry | ............. | H04B 1/3888 |
| | | | | 398/115 |
| 2014/0031093 A1* | 1/2014 | Song | ............. | H04B 1/3888 |
| | | | | 455/575.1 |
| 2014/0171159 A1* | 6/2014 | Endo | ............. | H01Q 1/243 |
| | | | | 455/575.7 |
| 2014/0177151 A1* | 6/2014 | Manda | ............. | H04M 1/0252 |
| | | | | 361/679.3 |
| 2015/0062460 A1* | 3/2015 | Yamada | ............. | G06F 3/041 |
| | | | | 349/12 |
| 2015/0155614 A1 | 6/2015 | Youn et al. | | |
| 2015/0326055 A1* | 11/2015 | Koyanagi | ............. | H02J 50/12 |
| | | | | 455/573 |
| 2017/0230073 A1 | 8/2017 | Youn et al. | | |

* cited by examiner

MOBILE TERMINAL

CROSS-REFERENCE TO RELATED APPLICATIONS

This application is a continuation of U.S. patent application Ser. No. 15/498,210, filed on Apr. 26, 2017, now U.S. Pat. No. 9,819,383, which is a continuation of U.S. patent application Ser. No. 14/480,149, filed on Sep. 8, 2014, now U.S. Pat. No. 9,680,206, which claims the benefit of earlier filing date and right of priority to Korean Application No. 10-2013-0149413, filed on Dec. 3, 2013, the contents of which is incorporated by reference herein in their entirety.

BACKGROUND OF THE INVENTION

1. Field of the Invention

The present invention relates to a mobile terminal having an antenna device capable of transmitting and receiving radio signals.

2. Background of the Invention

As a mobile terminal becomes multifunctional, the mobile terminal can be allowed to capture still images or moving images, play music or video files, play games, receive broadcast, etc., so as to be implemented as an integrated multimedia player.

Terminals can be divided into mobile/portable terminals and stationary terminals according to their mobility. The mobile terminal is a portable device that can be carried anywhere and have one or more of a function of performing voice and video calls, a function of inputting/outputting information, a function of storing data, etc.

In order to support and enhance such functions of the terminal, it can be considered to improve the configuration and/or software of the terminal.

With the recent trend of mobile terminals moving toward LTE service and smart phones, performance degradation and user inconvenience due to internal heat generation have been an issue. Especially, smart phones, which may require data throughput (LTE) of 100 Mbps and performance similar to PCs, operate at a 1 GHZ clock speed or faster, which causes generation of heat, resulting in a severe problem.

Moreover, there is a growing demand for mobile terminals which are operable even in a more severe environment so as to prevent malfunctions of the terminals even when dropped in water temporarily.

Accordingly, a mobile terminal having a novel structure capable of releasing heat generated from a variety of elements while keeping the inside sealed for water proof may be taken into consideration.

In addition to these attempts, there might be ways to improve the radio communication performance of mobile terminals with the functions of heat release and waterproof.

SUMMARY OF THE INVENTION

To achieve these and other advantages and in accordance with the purpose of this specification, as embodied and broadly described herein, there is provided a mobile terminal according to one embodiment of the present invention, the mobile terminal including: a metal frame including a base portion and an edge portion formed along the outer edge of the base portion; first and second cases bonded to the front and back sides of the metal frame so as to expose the edge portion to the outside; first and second waterproof layers formed between the cases and the metal frame; conductive members that operate a radiator for antennas, together with the edge portion, and are formed on one side of the second case; and feeding portions for feeding the conductive members, the feeding portions being disposed in an enclosed space formed by the waterproof layers.

According to one embodiment of the present invention, the mobile terminal may further include a non-metal coupling portion that is integrated with the metal frame so as to separate off an edge portion formation area and a base portion formation area.

According to one embodiment of the present invention, the waterproof layers may be formed between the non-metal coupling portion and the cases.

According to one embodiment of the present invention, the non-metal coupling portion may include a socket mounting portion where a socket adapted to electrically connect external equipment is mounted, and a through portion may be formed in a barrier rib defining the socket mounting portion so that the socket and a main circuit board formed in the enclosed space are interconnected by a flexible circuit board that passes through the through portion.

According to one embodiment of the present invention, the conductive members may include a first radiation member that is fed by a first feeding portion and a second radiation member that is fed by a second feeding portion, and the first and second radiation members may be formed on one side of the second case that covers the socket mounting portion.

According to one embodiment of the present invention, the edge portion may include a first edge member and a second edge member that are formed on either side, with the socket interposed therebetween, the first radiation member and the first edge member may be formed parallel and capacitively coupled to each other in a given area, and the second radiation member and the second edge member may be directly connected to each other.

According to one embodiment of the present invention, the feeding portions may be formed on the sub circuit board that is connected to the main circuit board, and one side of the radiation members may be connected to the feeding portions by pins that penetrate the second case.

According to one embodiment of the present invention, the other side of the second radiation member may be connected to the second edge member by a fastening portion that penetrates the second case.

According to one embodiment of the present invention, the metal frame may further include: a through hole through which the fastening portion is inserted; and a conductive connector that extends from the inner periphery of the through hole to the second edge member.

According to one embodiment of the present invention, the non-metal coupling portion may include an earphone jack coupler that allows for electrical connection of external equipment, and the earphone jack coupler may be connected to the flexible circuit board.

According to one embodiment of the present invention, the flexible circuit board may be connected to the sub circuit board, and the flexible circuit board may include a mismatch portion including at least one inductor or capacitor so as to prevent the earphone jack coupler from operating as an antenna radiator.

According to one embodiment of the present invention, a display and the sub circuit board may be respectively disposed on the front and back sides of the metal frame, and a shielding member may be formed between the sub circuit board and the display.

According to one embodiment of the present invention, the display may include: a display module configured to display image information; and a window bonded to the display module to cover one side of the display module, wherein the first case may include a window holder to which the window is bonded.

According to one embodiment of the present invention, a third waterproof layer may be formed between the window holder and the window.

According to one embodiment of the present invention, the first and second edge members constituting a radiator for first and second antennas may be formed on one side of the metal frame, and third and fourth edge members constituting a radiator for third and fourth radiators may be formed on the other side of the metal frame.

According to one embodiment of the present invention, the third edge member may be detachably coupled to the metal frame.

According to one embodiment of the present invention, the third edge member may include: a metal body; a waterproof portion formed along the edge of the back side of the metal body; and a hook portion that attaches the metal body to at least one of the first case, the second case, and the metal frame.

According to one embodiment of the present invention, the metal body may be capacitively coupled to a third conductive member formed on one side of the second case.

According to one embodiment of the present invention, the metal frame may include a hole that is covered by the non-metal coupling portion so that the non-metal coupling portion is integrated with the metal frame by plastic overmolding.

To achieve these and other advantages and in accordance with the purpose of this specification, as embodied and broadly described herein, there is provided a mobile terminal according to another embodiment of the present invention, the mobile terminal including: a metal frame laterally exposed to the outside, and having a display and a main circuit board bonded to either side to release heat; first and second cases bonded to either side of the metal frame so as to cover the display and the main circuit board; first and second waterproof layers formed between the cases and the metal frame to enclose the inside; and feeding portions for feeding the conductive members, the feeding portions being disposed in an enclosed space formed by the waterproof layers.

According to one embodiment of the present invention, the metal frame may include a base portion and an edge portion formed along the outer edge of the base portion.

According to one embodiment of the present invention, the mobile terminal may further include conductive members that operate a radiator for antennas, together with the edge portion, and are formed on one side of the second case.

A mobile terminal according to at least one of the above-described embodiments of the present invention can keep the temperature within a certain range to prevent a temperature rise caused by heat generation from electric elements, provide waterproof functionality, and achieve improved antenna performance.

Moreover, the main radiation area is directed lengthwise outward from the bottom of the terminal. Accordingly, deterioration of radiation characteristics due to a hand effect in a high-frequency band can be reduced.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated. In addition, a suffix "module" or "unit" used for constituent elements disclosed in the following description is merely intended for easy description of the specification, and the suffix itself does not give any special meaning or function. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

The mobile terminal according to the present invention may include a portable phone, a smart phone, a laptop computer, a digital broadcasting terminal, Personal Digital Assistants (PDA), Portable Multimedia Player (PMP), a navigation system, a slate PC, a tablet PC, a notebook, etc. However, it will be obvious to those skilled in the art that the present invention may be also applicable to a fixed terminal such as a digital TV and a desktop computer.

Figure 1:
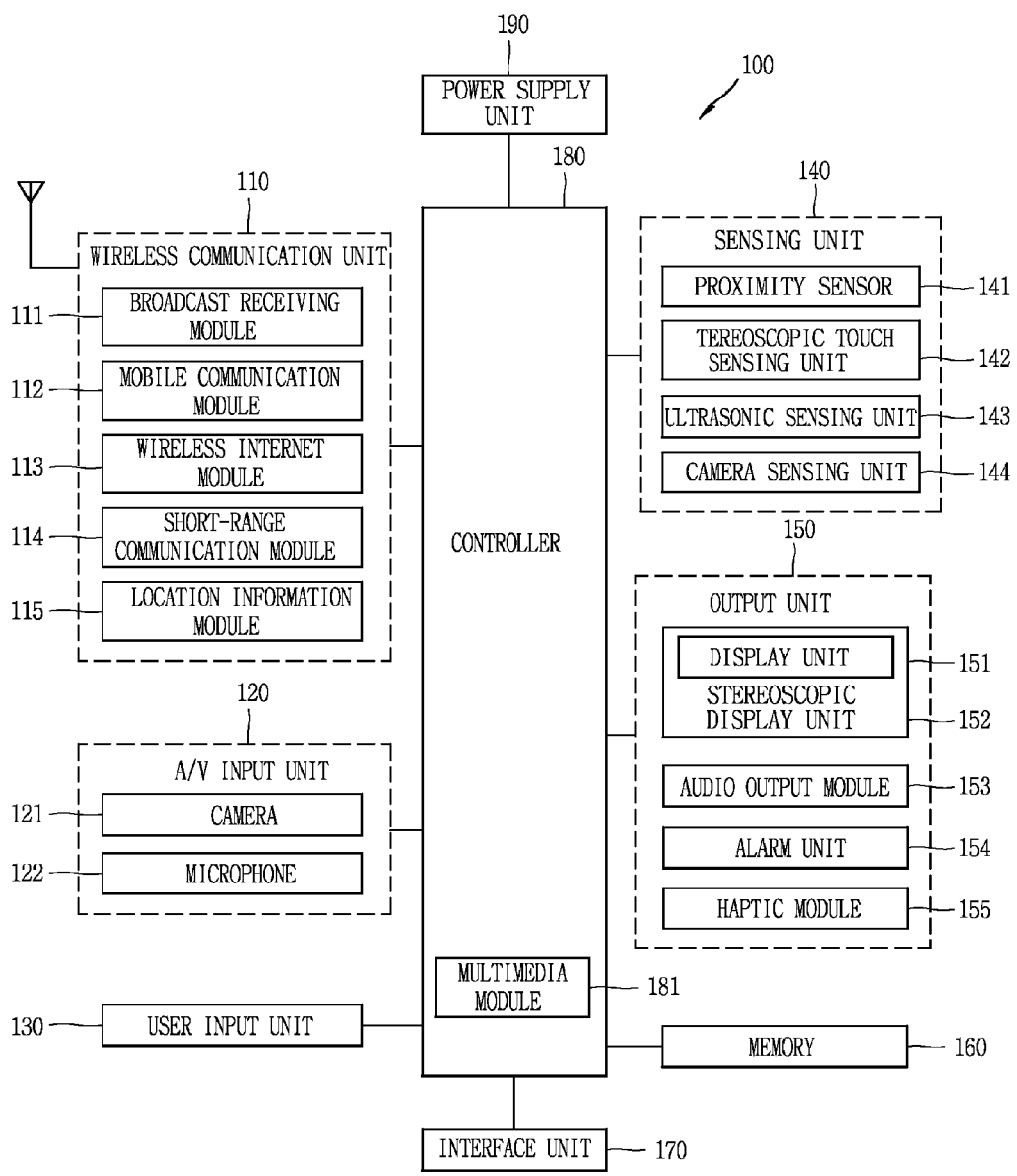
FIG. 1 is a block diagram of a mobile terminal according to an embodiment of the present invention.

FIG. 1 is a block diagram of a mobile terminal according to an embodiment of the present invention.

The mobile terminal 100 may comprise components, such as a wireless communication unit 110, an Audio/Video (A/V) input unit 120, a user input unit 130, a sensing unit 140, an output module 150, a memory 160, an interface unit 170, a controller 180, a power supply unit 190, and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include at least one of a broadcast receiving module 111, a mobile communication module 112, a wireless internet module 113, a short-range communication module 114 and a location information module 115.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcasting signals and/or broadcasting associated information received through the broadcast receiving module 111 may be stored in the memory 160.

The mobile communication module 112 transmits/receives wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The mobile communication module 112 is configured to implement a video call mode and a voice call mode. The video call mode indicates a call performed while a user views counterpart, whereas the voice call mode indicates a call performed while a user does not view counterpart. For implementation of the video call mode and the voice call mode, the mobile communication module 112 is configured to transmit and receive at least one of voice data and image data.

The wireless internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The location information module 115 denotes a module for sensing or calculating a location of a mobile terminal. An example of the location information module 115 may include a Global Positioning System (GPS) module.

Referring to FIG. 1, the A/V input unit 120 is configured to receive an audio or video signal. The A/V input unit 120 may include a camera 121, a microphone 122 or the like. The camera 121 processes image frames such as still images or moving images acquired by an image sensor in a video call mode or an image capturing mode. The processed image frames may be displayed on a display unit 151.

The image frames processed by the camera 121 may be stored in the memory 160 or transmitted to the outside via the wireless communication unit 110. Two or more cameras 121 may be provided according to the configuration of the mobile terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated while receiving and transmitting audio signals.

The user input unit 130 may generate input data for allowing a user to control various operations of the mobile communication terminal. The user input unit 130 may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of user contact with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is open or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner. The output unit 150 may include the display unit 151, a stereoscopic display unit 152, an audio output module 153, an alarm unit 154, a haptic module 155, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, or a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of these displays may be configured to be transparent so that outside may be seen therethrough, which may be referred to as a transparent display. A representative example of the transparent display may include a Transparent Organic Light Emitting Diode (TOLED), and the like. The rear surface portion of the display unit 151 may also be implemented to be optically transparent. Under this configuration, a user can view an object positioned at a rear side of a body through a region occupied by the display unit 151 of the body.

The display unit 151 may be implemented in two or more in number according to a configured aspect of the mobile terminal 100. For instance, a plurality of displays may be arranged on one surface integrally or separately, or may be arranged on different surfaces.

The display unit 151 may also be implemented as a stereoscopic display unit 152 for displaying stereoscopic images.

Here, the stereoscopic image may be a three-dimensional (3D) stereoscopic image, and the 3D stereoscopic image is an image refers to an image making a viewer feel that a gradual depth and reality of an object on a monitor or a screen is the same as a reality space. A 3D stereoscopic image is implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit 152 may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, include Wheatstone stereoscopic scheme, or the like.

The auto-stereoscopic scheme includes, for example, a parallax barrier scheme, a lenticular scheme, an integral imaging scheme, or the like. The projection scheme includes a reflective holographic scheme, a transmissive holographic scheme, or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

As illustrated, a left image and a right image required for implementing a 3D stereoscopic image is displayed on the stereoscopic display unit 152 by a stereoscopic processing unit (not shown). The stereoscopic processing unit may receive the 3D image and extract the left image and the right image, or may receive the 2D image and change it into a left image and a right image.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or capacitance occurring from a specific part of the display unit 151, into electric input signals. Also, the touch sensor may be configured to sense not only a touched position and a touched area, but also a touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the mobile terminal blocked by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, capacitance type proximity sensor, a magnetic type proximity sensor, an infrared rays proximity sensor, and so on. When the touch screen is implemented as capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

When a touch sensor is overlaid on the stereoscopic display unit 152 in a layered manner (hereinafter, referred to as 'stereoscopic touch screen'), or when the stereoscopic display unit 152 and a 3D sensor sensing a touch operation are combined, the stereoscopic display unit 152 may also be used as a 3D input device.

As examples of the 3D sensor, the sensing unit 140 may include a proximity sensor 141, a stereoscopic touch sensing unit 142, an ultrasonic sensing unit 143, and a camera sensing unit 144.

The proximity sensor 141 detects the distance between a sensing object (e.g., the user's finger or a stylus pen) applying a touch by using the force of electromagnetism or infrared rays without a mechanical contact and a detect surface. By using the distance, the terminal recognizes which portion of a stereoscopic image has been touched. In particular, when the touch screen is an electrostatic touch screen, the degree of proximity of the sensing object is detected based on a change of an electric field according to proximity of the sensing object, and a touch to the 3D image is recognized by using the degree of proximity.

The stereoscopic touch sensing unit 142 is configured to detect the strength or duration of a touch applied to the touch screen. For example, the stereoscopic touch sensing unit 142 may sense touch pressure. When the pressure is strong, it may recognize the touch as a touch with respect to an object located farther away from the touch screen toward the inside of the terminal.

The ultrasonic sensing unit 143 is configured to recognize position information of the sensing object by using ultrasonic waves.

The ultrasonic sensing unit 143 may include, for example, an optical sensor and a plurality of ultrasonic sensors. The optical sensor is configured to sense light and the ultrasonic sensors may be configured to sense ultrasonic waves. Since light is much faster than ultrasonic waves, a time for which the light reaches the optical sensor is much shorter than a time for which the ultrasonic wave reaches the ultrasonic sensor. Therefore, a position of a wave generation source may be calculated by using a time difference from the time that the ultrasonic wave reaches based on the light as a reference signal.

The camera sensing unit 144 includes at least one of a camera, a photo sensor, and a laser sensor.

For example, the camera and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the mobile terminal. terminal. The photo sensor is configured to scan a movement of the sensing object in proximity to the touch screen. In detail, the photo sensor includes photo diodes and transistors at rows and columns to scan content mounted on the photo sensor by using an electrical signal changing according to the quantity of applied light. Namely, the photo sensor calculates the coordinates of the sensing object according to variation of light to thus obtain position information of the sensing object.

The audio output module 153 may convert and output as sound audio data received from the wireless communication unit 110 or stored in the memory 160 in a call signal reception mode, a call mode, a record mode, a voice recognition mode, a broadcast reception mode, and the like. Also, the audio output module 153 may provide audible outputs related to a particular function performed by the mobile terminal 100 (e.g., a call signal reception sound, a message reception sound, etc.). The audio output module 153 may include a speaker, a buzzer or the like.

The alarm unit 154 outputs a signal for informing about an occurrence of an event of the mobile terminal 100. Events generated in the mobile terminal may include call signal reception, message reception, key signal inputs, a touch input etc. In addition to video or audio signals, the alarm unit 154 may output signals in a different manner, for example, using vibration to inform about an occurrence of an event. The video or audio signals may be also outputted via the audio output module 153, so the display unit 151 and the audio output module 153 may be classified as parts of the alarm unit 154.

A haptic module 155 generates various tactile effects the user may feel. A typical example of the tactile effects generated by the haptic module 155 is vibration. The strength and pattern of the haptic module 155 can be controlled. For example, different vibrations may be combined to be outputted or sequentially outputted.

Besides vibration, the haptic module 155 may generate various other tactile tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 155 may be implemented to allow the user to feel a tactile effect through a muscle sensation such as fingers or arm of the user, as well as transferring the tactile effect through a direct contact. Two or more haptic modules 155 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Also, the controller 180 may execute a lock state to restrict a user from inputting inputting control commands for applications when a state of the mobile terminal meets a preset condition. Also, the controller 180 may control a lock screen displayed in the lock state based on a touch input sensed on the display unit 151 in the lock state of the mobile terminal.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Figure 2:
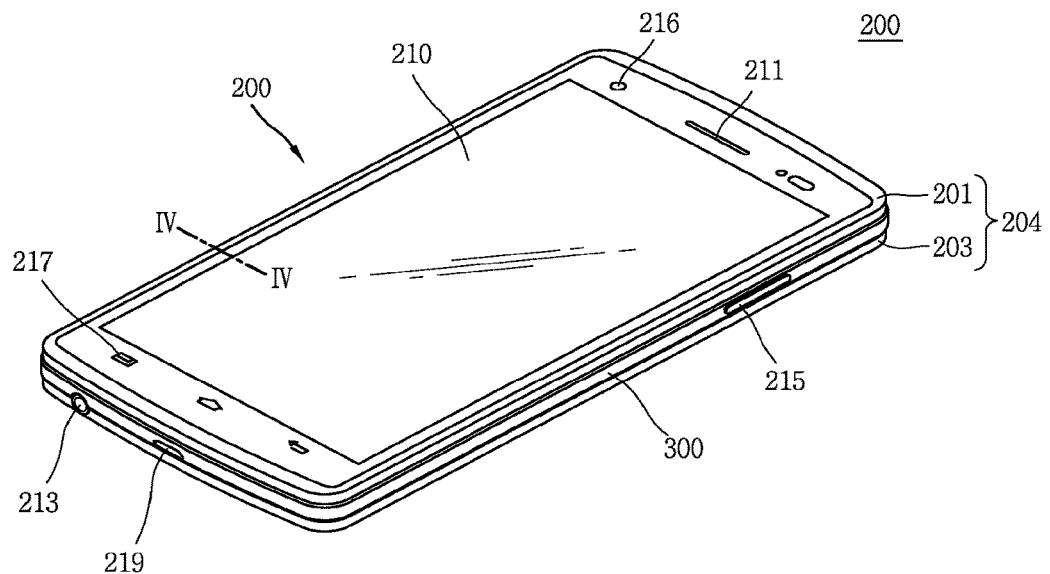
FIG. 2 is a front perspective view of a mobile terminal according to an embodiment of the present invention.
Figure 3:
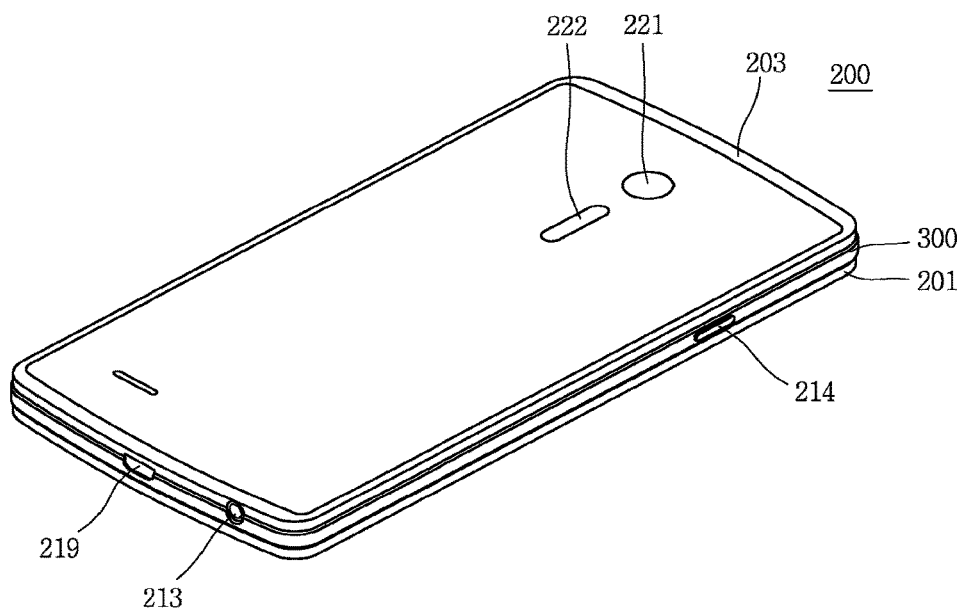
FIG. 3 is a rear perspective view of the mobile terminal of FIG. 2.

FIG. 2 is a front perspective view of a mobile terminal according to the present invention, and FIG. 3 is a rear perspective view of the mobile terminal of FIG. 2.

Referring to FIGS. 2 and 3, the mobile terminal 200 according to the present invention is provided with a bar type terminal body 204. However, the present invention is not limited to this, but may be applied to a slide type in which two or more bodies are coupled to each other so as to perform a relative motion, a folder type, a swing type, and the like. Further, the mobile terminal of the present invention may be applied to any portable electronic device having a camera and a flash, for instance, a portable phone, a smart phone, a notebook computer, a digital broadcasting terminal, Personal Digital Assistants (PDAs), Portable Multimedia Players (PMO), etc.

The mobile terminal 200 includes a terminal body 204 which forms the appearance thereof.

A case (casing, housing, cover, etc.) which forms the appearance of the terminal body 204 may include a front case 201, a rear case 202, and a battery cover 203 for covering the rear surface of the rear case 202.

A space formed by the front case 201 and the rear case 202 may accommodate various components therein. Such cases may be formed by injection-molded synthetic resin, or may be formed using a metallic material such as stainless steel (STS) or titanium (Ti).

On the front surface of the terminal body 204, may be disposed a display unit 210, a first audio output unit 211, a front camera 216, a side key 214, an interface unit 215, and a signal input unit 217.

The display unit 210 includes a liquid crystal display (LCD) module, organic light organic light emitting diodes (OLED) module, e-paper, etc., each for visually displaying information. The display unit 210 may include a touch sensing means for inputting information in a touch manner. Hereinafter, the display unit 210 including the touch sensing means is called 'touch screen'. Once part on the touch screen 210 is touched, content corresponding to the touched position is input. The content input in a touch manner, may be characters, or numbers, or menu items which can be set in each mode. The touch sensing means may be transmissive so that the display can be viewed, and may include a structure for enhancing visibility of the touch screen at a bright place.

Referring to FIG. 2, the touch screen 210 occupies most of the front surface of the front case 201.

The first audio output unit 211 may be implemented as a receiver for transmitting a call sound to a user's ear, or a loud speaker for outputting each type of alarm sound or a playback sound of multimedia.

The front camera 216 processes image frames such as still images or moving images, acquired by an image sensor in a video call mode or a capturing mode. The processed image frames may be displayed on the display unit 210.

The image frames processed by the front camera 216 may be stored in the memory 160, or may be transmitted to the outside through the wireless communication unit 110. The front camera 216 may be implemented in two or more according to a user's interface.

The user input unit 217 is manipulated to receive a command for controlling the operation of the mobile terminal 200, and may include a plurality of input keys. The input keys may be referred to as manipulation portions, and may include any type of ones that can be manipulated in a user's tactile manner.

For instance, the user input unit 217 may be implemented as a dome switch, or switch, or a touch screen, or a touch pad for inputting commands or information in a user's push or touch manner. Alternatively, the user input unit 217 may be implemented, for example, as a wheel for rotating a key, a jog, or a joystick. The user input unit 217 is configured to input various commands such as START, END and SCROLL.

A side key 214, an interface unit 215, an audio input unit 213, etc. are disposed on the side surface of the front case 201.

The side key 214 may be called 'manipulation unit', and may be configured to receive commands for controlling the operation of the mobile terminal 200. The side key 214 may include any type of ones that can be manipulated in a user's tactile manner. Content input by the side key 214 may be variously set. For instance, through the side key 214, may be input commands such as controlling the front and rear cameras 216 and 251, controlling the level of sound output from the audio output unit 211, and converting a current mode of the display unit 210 into a touch recognition mode.

The audio output unit 213 may be implemented as a microphone for receiving a user's voice, other sound, etc.

The interface unit 215 serves a path through which the mobile terminal 200 performs data exchange, etc. with an external device. For example, the interface unit 215 may be at least one of a connection terminal through which the mobile terminal 200 is connected to an ear phone by cable or radio, a port for local area communication, e.g., an infrared data association (IrDA) port, a Bluetooth portion, a wireless LAN port, and power supply terminals for supplying power to the mobile terminal 200. The interface unit 215 may be a card socket for accommodating an external card such as a subscriber identification module (SIM) card, a user identity module (UIM) card or a memory card for storing information.

A power supply unit 240 and the rear camera 221 are disposed on the rear surface of the body 204.

A flash 222 and a mirror (not shown) may be disposed close to the rear camera 221. When capturing an object by using the rear camera 221, the flash 222 provides light onto the object.

When the user captures an image of himself/herself by using the rear camera 221, the mirror can be used for the user to look at himself/herself therein.

The rear camera 221 may face a direction which is opposite to a direction faced by the front camera 216, and may have different pixels from those of the front camera 216.

For example, the front camera 216 may operate with relatively lower pixels (lower resolution). Thus, the front camera 216 may be useful when a user can capture his face and send it to another party during a video call or the like. On the other hand, the rear camera 221 may operate with a relatively higher pixels (higher resolution) such that it can be useful for a user to obtain higher quality pictures for later use. The front camera 216 and the rear camera 221 may be installed at the terminal body 204 so as to rotate or pop-up.

The power supply unit 240 is configured to supply power to the mobile terminal 200. The power supply unit 240 may be mounted in the terminal body 204, or may be detachably mounted to the terminal body 204.

Figure 4:
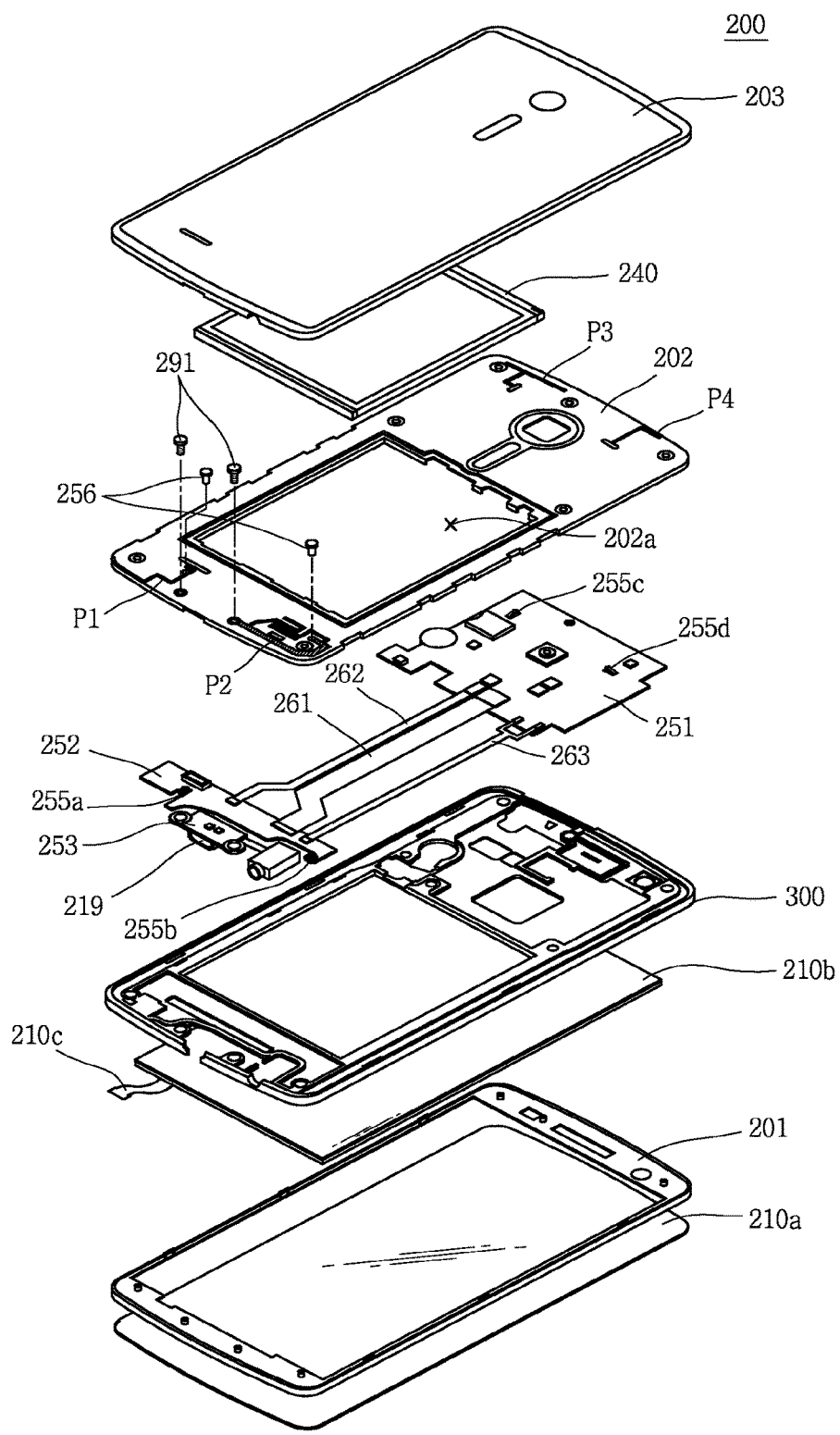
FIG. 4 is an exploded perspective view of FIG. 3.

FIG. 4 is an exploded perspective view of FIG. 3.

Referring to FIG. 4, the mobile terminal includes a window 210a and a display module 210b which constitute the display 210. The window 210a may be bonded to one side of the front case 201. The window 210a and the display module 210b may be integral with the display module 210b.

A metal frame 300 is formed between the front case 201 and the rear case 202 case 202 to support electric elements between them. The metal frame 300, a support structure inside the terminal, is formed in a way that supports at least one of a display module 210, a camera module 221, an antenna device, a battery 240, and a circuit board, for example.

Part of the metal frame 300 may be exposed outside the terminal. Also, the metal frame 300 may constitute part of a sliding module that interconnects a main body and a display in a slide-type terminal, rather than a bar-type.

FIG. 4 illustrates, for example, that a main circuit board 251 is disposed between the metal frame 300 and the rear case 202 and the display module 210b is bonded to one side of the metal frame 300. The main circuit board 251 and a battery may be disposed on the other side of the metal frame 300, and a battery case 203 may be bonded to the rear case 202 so as to cover the battery.

The window 210a is bonded to one side of the front case 201. A touch sensing pattern may be formed on one side of the window 210a to sense a touch. The touch sensing pattern is configured to sense a touch input and transmit light therethrough. The touch sensing pattern may be mounted on the front side of the window 210a and configured to convert a change in voltage, etc in a specific region of the window 210a into an electric input signal.

The display module 210b is mounted on the back side of the window 210a. This embodiment discloses a thin film transistor-liquid crystal display (TFT LCD) as an example of the display module 210b, however, the present invention is not necessarily limited thereto.

For example, the display module 210b may be a liquid crystal display (LCD), an organic light-emitting diode (OLED), a flexible display, a 3D display, and so on.

The main circuit board 251 may be mounted at the bottom of the display module module 210b, as well as on one side of the metal frame 300, as discussed above. And, at least one electronic element is mounted on the bottom side of the main circuit board 251.

A battery holder 262 which is recessed to hold the battery may be formed on the metal frame 300. A contact terminal which is connected to the main circuit board 251 to allow the battery 240 to supply power to the terminal body may be formed on one side of the battery holder 262.

An antenna device may be formed in the upper and lower parts of the mobile terminal. Moreover, a plurality of antenna devices may be disposed at either end of the terminal, each of the antenna devices being adapted to transmit and receive radio signals in different frequency bands. Such an antenna device may include conductive members that are formed on one side of a carrier. For example, a carrier with conductive members may be placed at the bottom of the terminal.

The metal frame 300 may operate as the ground. That is, the main circuit board 251 or the antenna device may be grounded to the metal frame 300, and the metal frame 300 may operate as the ground of the main circuit board 251 or antenna device. In this case, the metal frame 300 can extend the ground of the mobile terminal.

The main circuit board 251 is electrically connected to the antenna device, and configured to process radio signals (or radio electromagnetic waves) transmitted and received by the antenna device. For radio signal processing, a plurality of transceiver circuits may be formed or mounted on the main circuit board 251.

The transceiver circuits may include at least one integrated circuit and related electric elements. For example, the transceiver circuits may include a transmitter integrated circuit, a receiver integrated circuit, a switching circuit, an amplifier, etc.

A plurality of transceiver circuits may cause a plurality of antenna devices to simultaneously operate by simultaneously feeding the conductive members with a radiating conductive pattern. For instance, any one of two antenna devices can transmit while the other is receiving. Alternatively, both of them can transmit or receive.

A coaxial cable may be formed to connect the circuit board with each antenna device. For example, the coaxial cable may be connected to feeding devices for feeding antenna devices.

Figure 5:
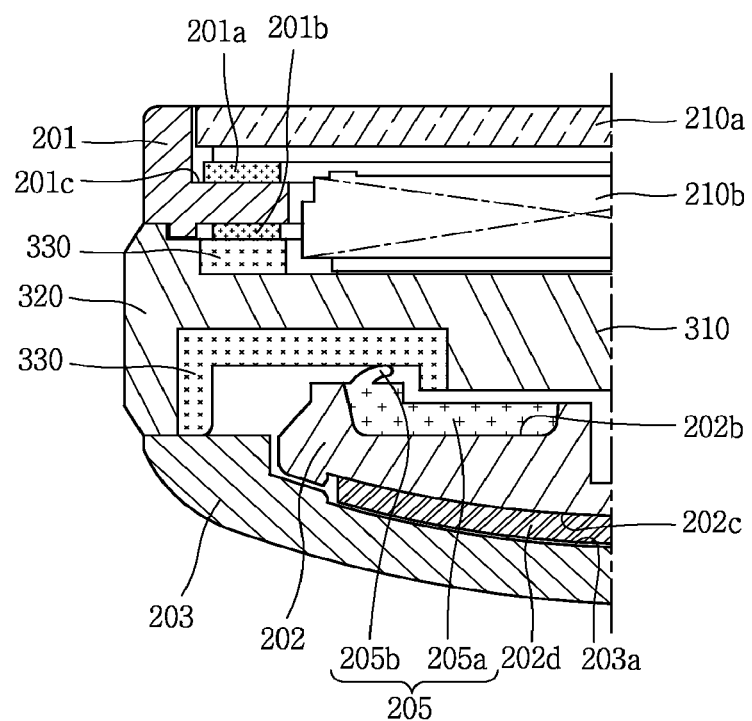
FIG. 5 is a cross-sectional view taken along line IV-IV of FIG. 2.

FIG. 5 is a cross-sectional view taken along line IV-IV of FIG. 2.

Referring to FIG. 5, a first case 201 may be bonded to the front side of the metal frame 300, and a second case 202 may be bonded to the back side. The first case 201 may be a front case, and the second case 202 may be a rear case.

The metal frame 300 includes a base portion 310 and an edge portion 320, and may form the outer appearance of the terminal body, with part of it exposed to the outside, as well as it supports the inside of the terminal body.

The base portion 310 may be in the form of a flat panel and have the display 210 on the front side. In this case, one side of the display 210 may be brought into contact with the base portion 310 and supported by the base portion 310. The display 210 may include the display module 210b and the window 210a, and the display module 210b and the window 210a may be integral. And, the display 210 may be bonded to the terminal in such a way that the window 210a constituting the display 210 is mounted to the first case 201. The first case 201 may include a window holder 201c to which the window 201 is bonded.

The edge portion 320 may be formed along the outer edge of the base portion portion 310, and exposed outside the terminal body between the first and second cases 201 and 202. The edge portion 320 may be connected to the base portion 310 to let internal heat out. In this case, at least one part may come into contact with the base portion 310.

The base portion 310 and the edge portion 320 may be separated off from each other by a non-metal coupling portion 330. The non-metal coupling portion 330 may be made of synthetic resin, etc, and the non-metal coupling portion 330 may be integrated with the metal frame 300 by plastic overmolding.

When the first case 201 is bonded to the front side of the metal frame 300 and the second case 202 is bonded to the back side, waterproof layers may be formed between the case 201 and 202 and the metal frame 300. In one example, a first waterproof layer 201b may be formed between the metal frame 300 and the first case 201, and a second waterproof layer 205 may be formed between the metal frame 300 and the second case 202.

The waterproof layers 201b and 205 may be formed between the cases 201 and 202 and the non-metal coupling portion 330 covering the metal frame 300. That is, one side of the waterproof layers 201b and 205 may be closely attached to the non-metal coupling portion 330 because members for waterproof purpose may be attached better on a non-metal surface than on a metal surface.

The first waterproof layer 201b may be disposed to fill the gap between the first the first case 201 and the metal frame 300. In this case, if one side of the metal frame 300 is covered by the non-metal coupling portion 330, the first waterproof layer 201b may be formed between the non-metal coupling portion 330 and the first case 201. Two sides of the first waterproof layer 201b may be attached to the first case 201 and the metal frame 300, respectively, or attached to the first case 201 and the non-metal coupling portion 330, respectively. The first waterproof layer 201b of this type may be formed of double-sided tape.

The second waterproof layer 205 may be bonded to the second case 202. To this end, the second case 202 may include a groove portion 202b. The groove portion 202b may be formed along the edge of the second case 202. The second waterproof layer 205 may include a first member 205a and a second member 205b, and the first member 205a may be bonded to the groove portion 202b. The second member 205b may protrude from the first member 205a, and may be deformed toward the inside of the terminal when the second case 202 is bonded to the metal frame 300. The second member 205b of this type may be formed of an elastic rubber material.

Further, a third waterproof layer 201a may be formed between the window holder 201c and the window 210a. The third waterproof layer 201a may be formed of double-sided tape, both sides of which are attached to the window holder 201c and the window 210a, respectively.

On the other hand, the second case 202 may include an opening 202a through which the battery 240 is exposed, and a third case 203 may be bonded to the second case 202 or the metal frame 300 so as to cover the opening 202a and the second case 202.

The internal space of the terminal may be sealed by the above-explained waterproof layers. That is, the waterproof layers may form an enclosed internal space in the terminal.

In this way, the metal frame 300 according to the present invention may be configured to fulfill both of the heat release and waterproof functions. Besides, the metal frame 300 may be connected to other conductive members constituting the antenna so that the metal frame 300 on the outside operates as an antenna radiator.

Figure 6:
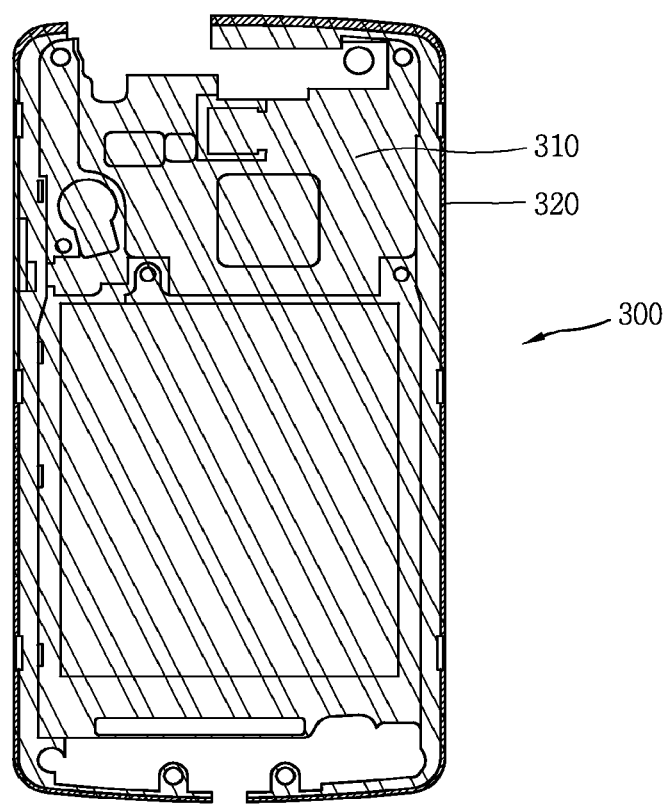
FIG. 6 is a rear view of a metal frame according to an embodiment of the present invention.
Figure 7:
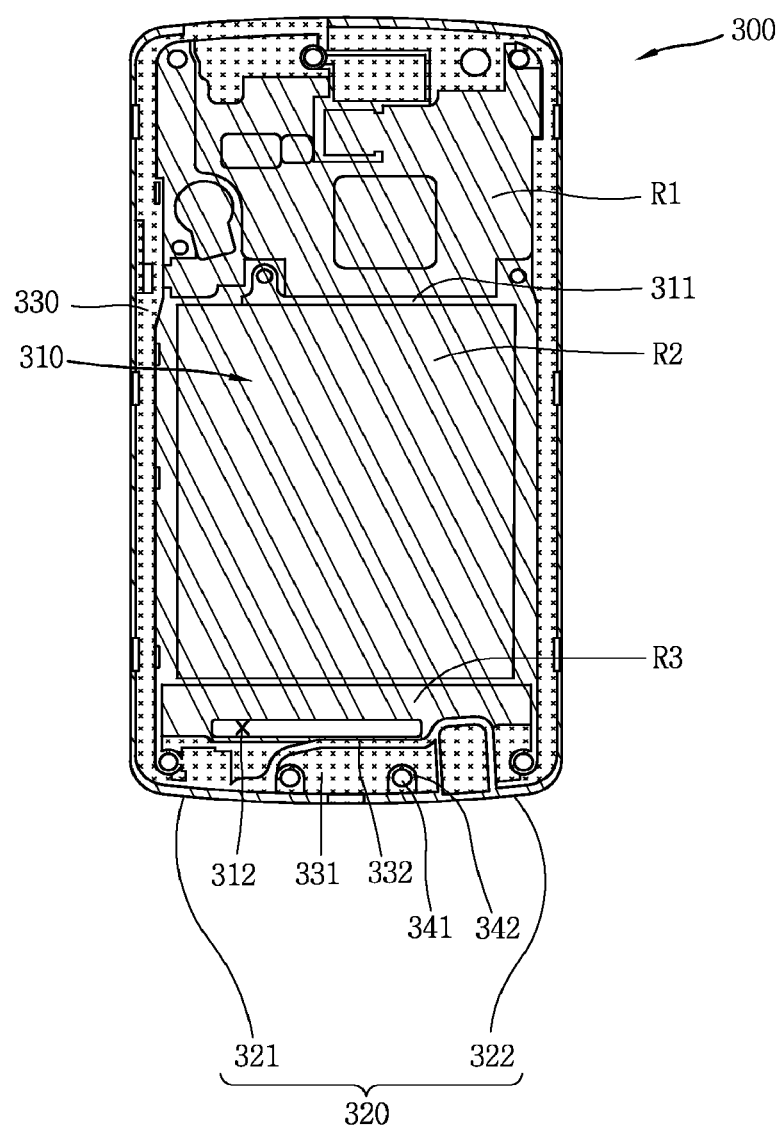
FIG. 7 is a view of the metal frame of FIG. 6 with a non-metal coupling portion bonded to it.
Figure 8:
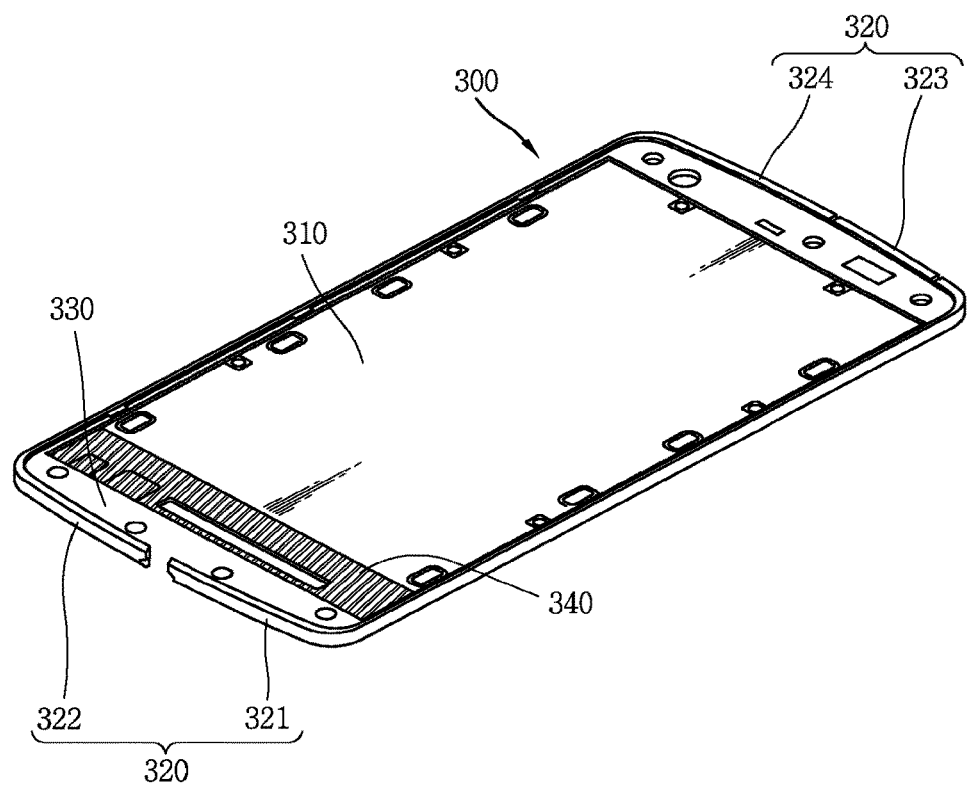
FIG. 8 is a view showing the front side of FIG. 7.

FIG. 6 is a rear view of a metal frame 300 according to an embodiment of the of the present invention. FIG. 7 is a view of the metal frame 300 of FIG. 6 with a non-metal coupling portion 330 bonded to it. FIG. 8 is a view showing the front side of FIG. 7. FIG. 6 illustrates the metal frame 300 with the non-metal coupling portion 330 not bonded to it. FIGS. 7 and 8 illustrate the back side and front side of the metal frame 300 with the non-metal coupling portion 330 bonded to it.

Referring to FIGS. 6 to 8, the metal frame 300 includes a base portion 310 and an edge portion 320, and the base portion 310 and the edge portion 320 are separated off on the front and back sides of the metal frame 300 by the non-metal coupling portion 330, which is to be bonded to the metal frame 300.

The metal frame 300 and the non-metal coupling portion 330 may be integrated by plastic overmolding. Plastic overmolding is one of the molding methods by which a plastic member is integrated with a metal member. For plastic overmolding, at least one hole may be formed in the metal frame 300 where the non-metal coupling portion 330 is bonded. To cover this hole, the non-metal coupling portion 330 may be integrated with the metal frame 300 when the non-metal coupling portion 330 is injection-molded and hardened.

A plurality of regions may be formed on the back side of the metal frame 300. These regions may be separated off by a rib 311 that protrudes from the back side of the metal frame 300.

The first region R1 is a region that is formed in the upper part of the back side of back side of the metal frame 300, and the main circuit board 251 may be disposed on the first region R1. The second region R2 is a region that is formed in the middle of the back side of the metal frame 300, and the battery 240 which supplies power to the mobile terminal may be disposed on the second region R2. The third region R3 may be formed below the second region R2, and separated off from the second region R2 by the rib 311. A sub circuit board 252 may be disposed on the third region R3.

A plurality of electric elements 251a may be mounted on one side of the main circuit board 251. These electric elements may be microprocessors for communication that operate at high speed, or microprocessors for other purposes than communication. Especially, these electric elements may be communication chips including a modem chip, an RF transceiver chip, and an RF receiver chip and/or power-supply chips including a PA (power amplifier) chip and a PMIC (power management IC) chip. The above-described communication chips and/or power-supply chips may generate a large amount of heat during operation. That is, in view of the characteristic of the terminal which is getting advanced, wireless communication devices consumes a higher percentage of entire power used by the terminal and an absolute amount of power used by the wireless communication device increases as well. This accordingly causes an increase in the quantity of heat generated by the wireless communication device. Therefore, if the heat generated by the wireless communication device is effectively discharged to the outside of the terminal, the temperature of the terminal may be overall controlled within a stable range. The power-supply chips which carry out power supply, conversion, rectification and charging with respect to the wireless communication device may also generate heat due to internal resistance. The terminal according to the embodiment of the present invention may effectively release the heat generated by the electric elements out of the terminal through the metal frame 300, resulting in overall controlling the temperature of the terminal into a stable range.

These electric elements 251a may be disposed to be covered with a thermally conductive shielding member. Due to this, heat may be transferred to the metal frame 300 through the shielding member when the shielding member and the metal frame 300 come into contact with each other.

In addition, heat may be transferred to the metal frame 300 as the electric elements 251a come into direct contact with the metal frame 300. Besides, the heat caused by the electric elements may be transferred to the metal frame 300 when the electric elements and the metal frame 300 are not in contact with each other.

Figure 9:
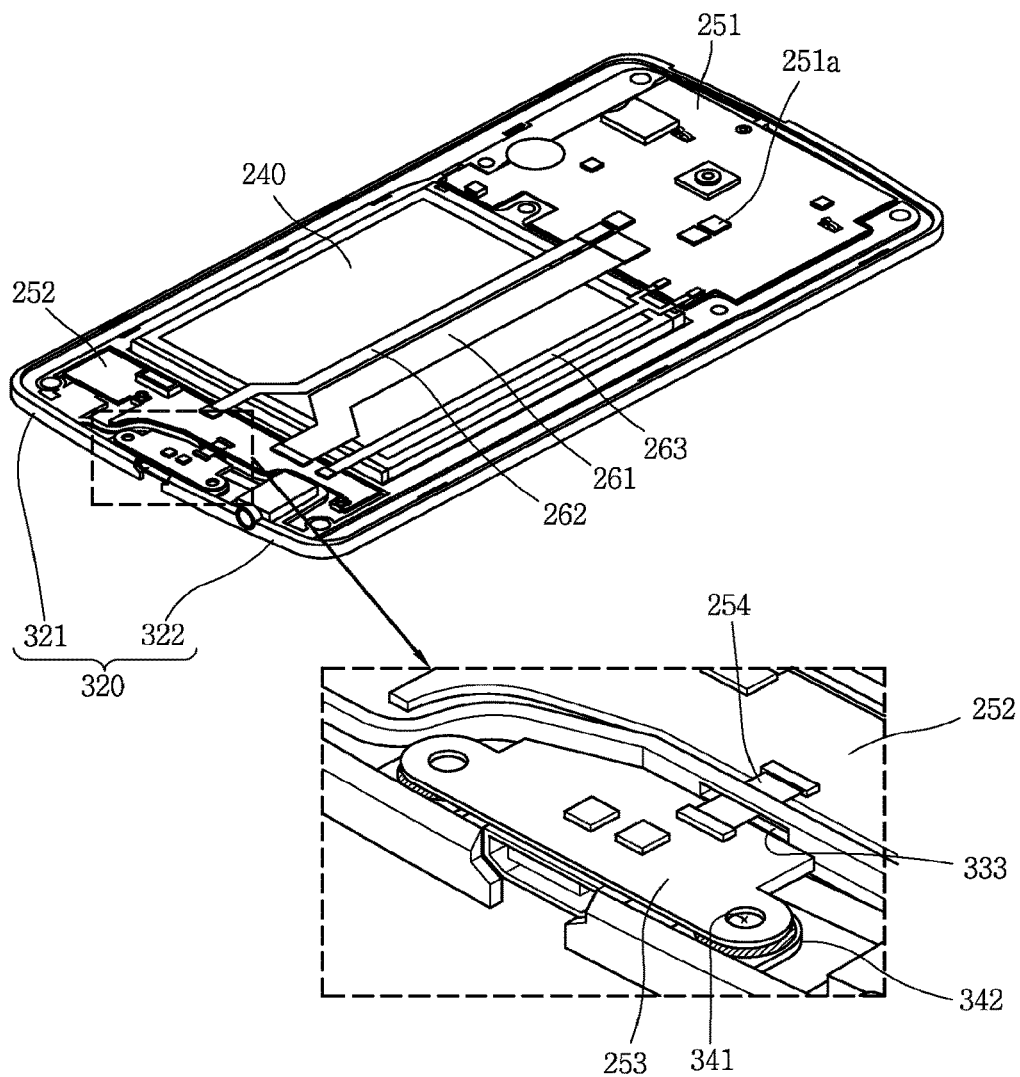
FIG. 9 is a view showing a battery, circuit boards, etc being mounted on the metal frame with the non-metal coupling portion of FIG. 7 bonded to it.

FIG. 9 is a view showing a battery, circuit boards, etc being mounted on the metal frame with the non-metal coupling portion of FIG. 7 bonded to it.

Referring to FIG. 7 and FIG. 9, the back side of the metal frame 300 may be partitioned into the first to third regions R1, R2, and R3.

The main circuit board 251 is disposed on the first region R1, and the battery 240 is disposed on the second region R2. The sub circuit board 252 is disposed on the third region R3.

Referring to FIG. 7, the metal frame 300 includes a first through portion 312, and a first flexible circuit board 210c (see FIG. 4) interconnecting the display 210 and the sub circuit board 252 passes through the first through portion 312. The first through portion 312 may be formed in the third region R3. The display 210 on the front side and the sub circuit board 252 on the back side, with the metal frame 300 interposed between them, may be connected by the first flexible circuit board 210c.

In this case, the sub circuit board 252 may include at least one electric element element that is adapted to transmit signals to the display 210 or control the display 210. Further, the sub circuit board 252 may include at least one electric element that is adapted to receive a touch sensing signal from a touch sensing pattern and process it. The touch sensing pattern and the sub circuit board 252 may be connected by the first flexible circuit board 210c. To this end, the first flexible circuit board 210c may include a plurality of lines, and some of these lines may interconnect the display 210 and the sub circuit board 252, and the other lines may interconnect the touch sensing pattern and the sub circuit board 252.

Referring to FIG. 9, the main circuit board 251 and the sub circuit board 252 are spaced apart from each other, with the battery 240 interposed between them. A second flexible circuit board 261 and 262 that interconnects the main circuit board 251 and the sub circuit board 252 may be further provided to electrically connect the main circuit board 251 and sub circuit board 252 spaced apart from each other and transmit or receive signals.

In this case, part of the second flexible circuit board 261 and 262 may cover the battery 240 and extend from the main circuit board 251 to the sub circuit board 252. This is because the main circuit board 251 and the sub circuit board 252 are spaced apart from each other, with the battery 240 between them. If the battery 240 is not a removable type but an integral type, it is better for the assembling process to connect the main circuit board 251 and the sub circuit board 252 by means of the second flexible circuit board 261 and 262 after mounting the battery 240, the main circuit board 251, and the sub circuit board 252 on the back side of the metal frame 300. The volume of the battery 240 may go up or down depending on how the battery 240 is used. Accordingly, the second flexible circuit board 261 and 262 is disposed so as to cover the battery 240, leaving a margin of a certain length or more, so that it remains connected to the main circuit board 251 or the sub circuit board 252 even with an increase in the volume of the battery 240.

A coaxial cable 263 may be further provided to electrically connect the main circuit board 251 and sub circuit board 252 spaced apart from each other.

The non-metal coupling portion 330 may include a socket mounting portion 331 portion 331 where a socket 219 adapted to electrically connect external equipment is mounted. The socket mounting portion 331 and the third region R3 may be separated off by a barrier rib 332. The barrier rib 332 includes a second through portion 333 through which a third flexible circuit board 254 passes. The sub circuit board 252 and the socket 219 may be electrically connected through the third flexible circuit board 254 that passes through the second through portion 333.

When the second case 202 is bonded to the metal frame 300, a second member 205b may be closely attached to the barrier rib 332, and water-seal the inside of the terminal while being closely attached to it.

Figure 10:
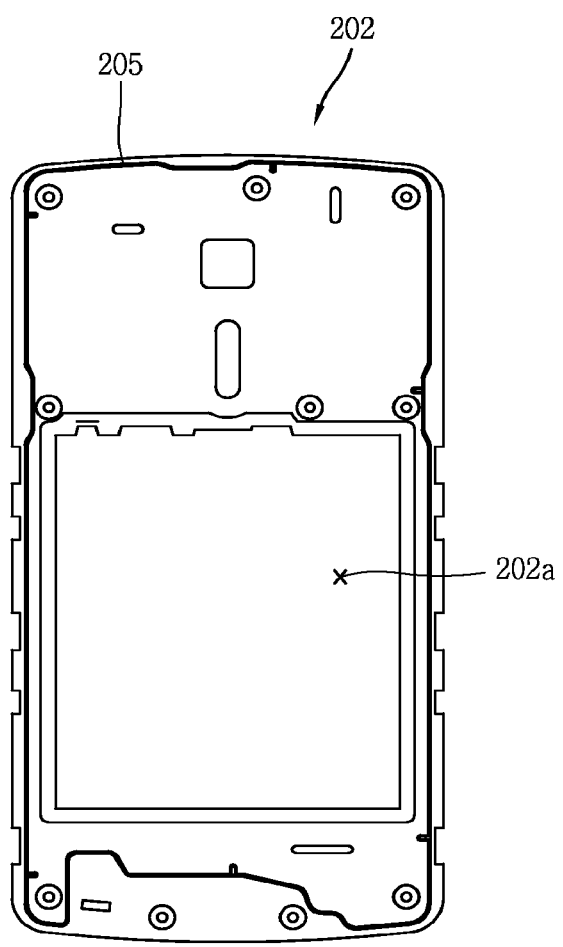
FIG. 10 is a view showing the front side of a second case according to an embodiment of the present invention.
Figure 11:
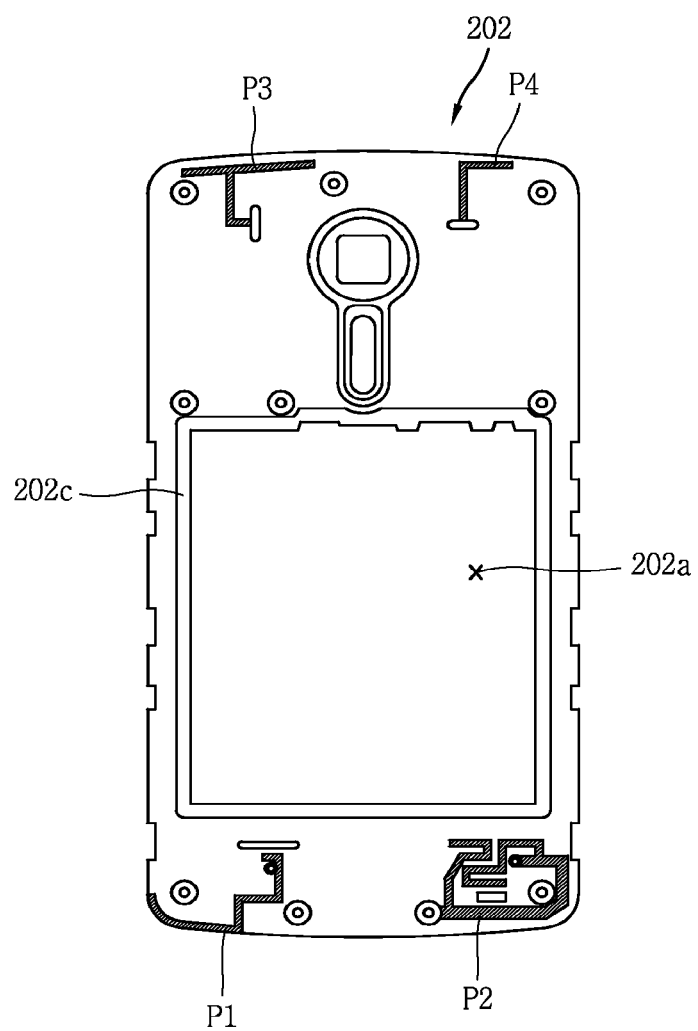
FIG. 11 is a view showing the back side of the second case according to an embodiment of the present invention.

FIG. 10 is a view showing the front side of the second case 202 according to an embodiment of the present invention. FIG. 11 is a view showing the back side of the second case 202 according to an embodiment of the present invention.

Referring to FIG. 10, the second waterproof layer 205 may be formed on the front side of the second case 202. The second waterproof layer 205 may be bonded to the second case 202. To this end, the second case 202 may include a groove portion 202b. The groove portion 202b may be formed along the edge of the second case 202. The second waterproof layer 205 may include a first member 205a and a second member 205b, and the first member 205a may be bonded to the groove portion 202b. The second member 205b may protrude from the first member 205a, and may be deformed toward the inside of the terminal when the second case 202 is bonded to the metal frame 300. The second member 205b of this type may be formed of an elastic rubber material.

The second case 202 includes an opening 202a, and the opening 202a is is formed to expose the battery 240. The volume of the battery 240 may go up or down depending on how the battery 240 is used, and the opening 20a may provide a space that expands when the battery volume increases.

Referring to FIG. 11, the second case 202 may include a first recess 202c that is recessed from one side of the second case 202 along the outer edge of the opening 202a. Since foreign substances may enter the opening 202a, a fourth waterproof layer 202d (see FIG. 5) may be formed on the first recess 202c.

Moreover, a plurality of conductive members may be formed in the upper and lower parts of the second case 202.

Figure 12A:
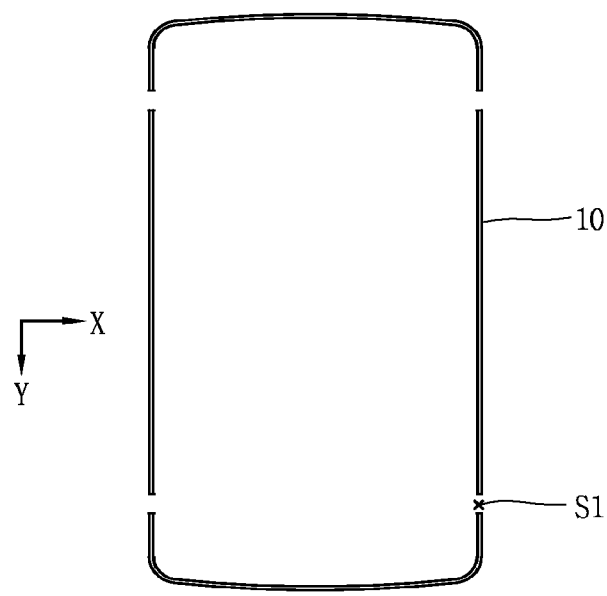
FIGS. 12a and 12b are conceptual views showing a comparative example and an embodiment, respectively, which illustrate examples in which slits are cut through edge members.
Figure 12B:
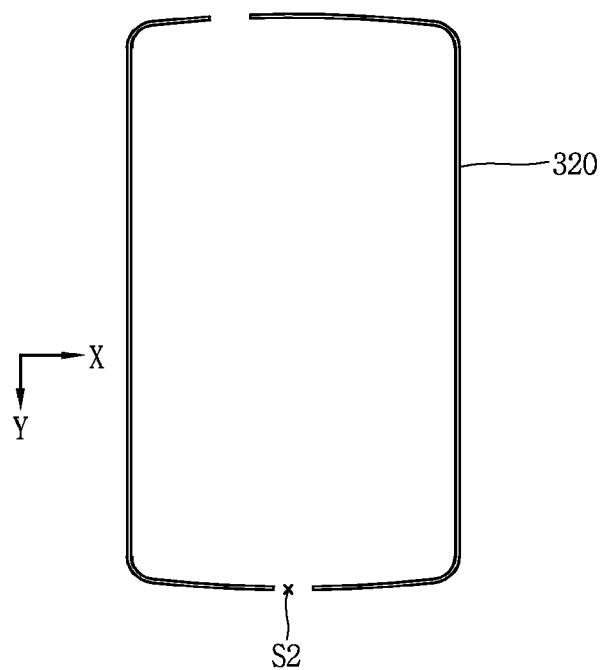

FIGS. 12a and 12b are conceptual views showing a comparative example and an embodiment, respectively, which illustrate examples in which slits are cut through edge members.

Referring to FIG. 12a, slits S1 are cut open widthwise (x-axis) along the terminal body 10. In this case, if the user grab the terminal body with a conductive case that forms the outer appearance, the palm will cover the slits where the antenna device mainly radiates. This may create a hand effect which causes a reduction in the radiation efficiency of the antenna.

FIG. 12b illustrates a terminal with slits S2 open lengthwise (y-axis) along the terminal body in order to prevent a reduction in antenna efficiency due to a hand effect according to an embodiment of the present invention. The slits S2 may be covered with a non-conductive member. Especially, as illustrated therein, the slits S2 according to the present invention may be formed on the edge portion 320.

In this way, according to the embodiment of the present invention, the slits S2 are open to the bottom of the terminal body, whereby the main radiation area is directed lengthwise outward from the bottom of the terminal. Accordingly, deterioration of radiation characteristics due to a hand effect in a high-frequency band can be reduced.

Figure 13:
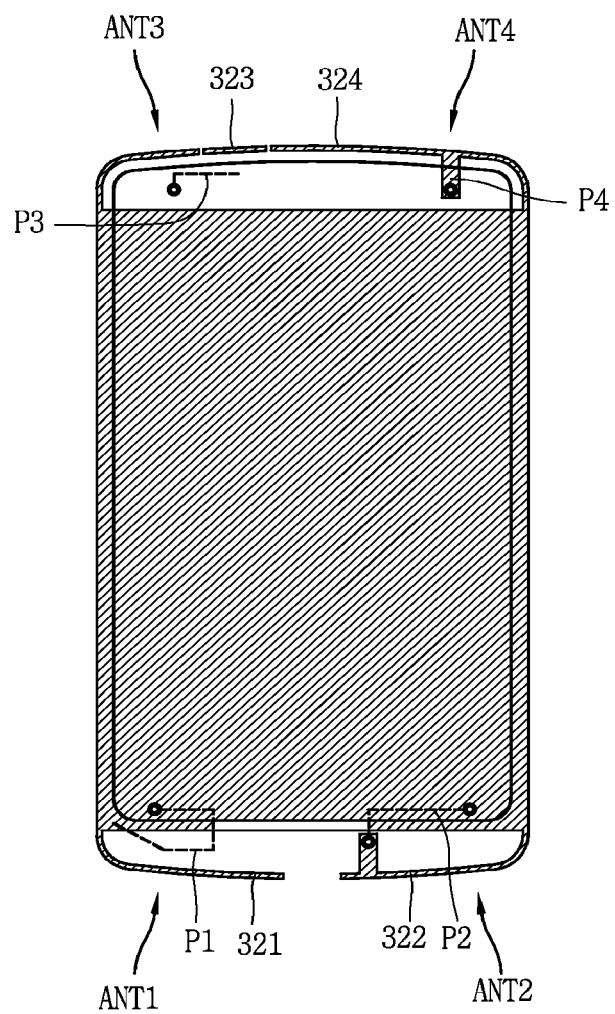
FIG. 13 is a conceptual diagram showing the positions of antenna devices according to an embodiment of the present invention.

FIG. 13 is a conceptual diagram showing the positions of antenna devices according to an embodiment of the present invention.

Referring to FIG. 13, first to fourth antenna devices ANT1, ANT2, ANT3, and ANT4 may be formed by using the edge members of the metal frame as part of antenna radiators.

The first and second antenna devices ANT1 and ANT2 may be formed at the bottom of the mobile terminal, and the third and fourth antenna devices ANT3 and ANT4 may be formed at the top of the mobile terminal.

As shown in FIG. 13, the antenna devices ANT1, ANT2, ANT3, and ANT4 may be disposed adjacent to each other at the top and bottom of the mobile terminal. When any one of the antenna devices at the top or bottom of the mobile terminal transmits a signal, part of the transmitted signal may affect the other antenna device.

For example, when the first antenna device ANT1 transmits a signal, other currents induced by the current flowing along the surface of the first antenna device ANT1 may flow along the surface of the second antenna device ANT2. Such mutual coupling exerts a greater effect as the distance d between the first antenna device ANT1 and the second antenna device ANT2 becomes shorter. Mutual coupling, which is caused by the proximity of the first and second antenna devices ANT1 and ANT2, may lead to a loss of the transmission power of the first antenna device ANT1 and a decline in the performance of a transmitter connected to the adjacent second antenna device ANT2, and may also have an adverse effect such as receiver saturation or a drop in sensitivity. Moreover, the currents induced to the adjacent second antenna device ANT2 will distort the gain pattern.

The influence of mutual coupling can be diminished by electrically isolating the first antenna device ANT1 and the second antenna device ANT2 from each other. As a method of electric isolation, the first antenna device ANT1 and the second antenna device ANT2 may be isolated from each other by no less than half $\lambda/2$ the wavelength of the fundamental frequency. However, it is practically impossible to use this method because a small-sized terminal, such as a mobile terminal, uses frequencies from 700 to 800 MHz and the value of $\lambda/2$ reaches 400 mm.

Especially, in a system equipped with a plurality of antennas that operate in MIMO or diversity mode, in order to ensure proper signal transmission/reception performance, the mutual coupling coefficient and envelope correlation coefficient between a primary antenna (a main antenna at the transmitter or receiver side) and a secondary antenna (a sub antenna at the receiver side of a diversity or MIMO system) must be low.

For example, if the requirements for reception are met, including that the main antenna must operate in the same way as a single-receiver, the difference in gain between antennas must be less than 6 dB, the envelope correlation coefficient (ECC) must be less than 0.5, the transmitter side always has to use the main antenna, and the antenna to antenna isolation must be greater than 8 dB, the antennas can operate well as MIMO antennas in LTE frequency bands.

Apart from the antenna's fundamental performance requirements, the most difficult requirement to meet when implementing MIMO antennas in the mobile terminal is that the ECC, which is a measure of the correlation between two antennas, must be less than 0.5.

To satisfy these requirements, the two antenna devices are required to be be spaced apart by a distance of one-half wavelength or more, or the two antenna devices need to be polarized in directions orthogonal to each other as much as However, the length of one-half wavelength can go up to as high as 400 mm in case of LTE, the standard for 4G mobile communications, that uses the 700 MHz band, so it might be practically difficult to isolate the two antenna devices in the mobile terminal by a distance of one-half wavelength or more.

According to the present invention, in order to reduce mutual coupling between adjacent antenna devices, one of the antenna devices adopts a direct feeding method, and the other antenna device adopts an indirect feeding method. Due to this, coupling between the antennas can be reduced.

As shown therein, the first and third antennas ANT1 and ANT3 are indirectly fed with electricity via capacitive coupling by using conductive members and edge members, and the second and fourth antenna devices ANT2 and ANT4, which are respectively adjacent to the first and third antenna devices ANT1 and ANT3, are directly fed with electricity.

Capacitive coupling can occur by arranging the conductive member and the edge member parallel at a predetermined distance from each other in a given area.

Due to this capacitive coupling, the capacitive reactance of the antennas may increase. The resonance frequency decreases with increasing capacitive reactance because the input impedance due to capacitance is inversely proportional to frequency. A decrease in resonance frequency means that the antenna devices can operate at shorter lengths in a lower frequency band because of capacitive coupling. That is, if the antenna devices include capacitively-coupled members, they can operate in a lower frequency band within a smaller space.

Figure 14:
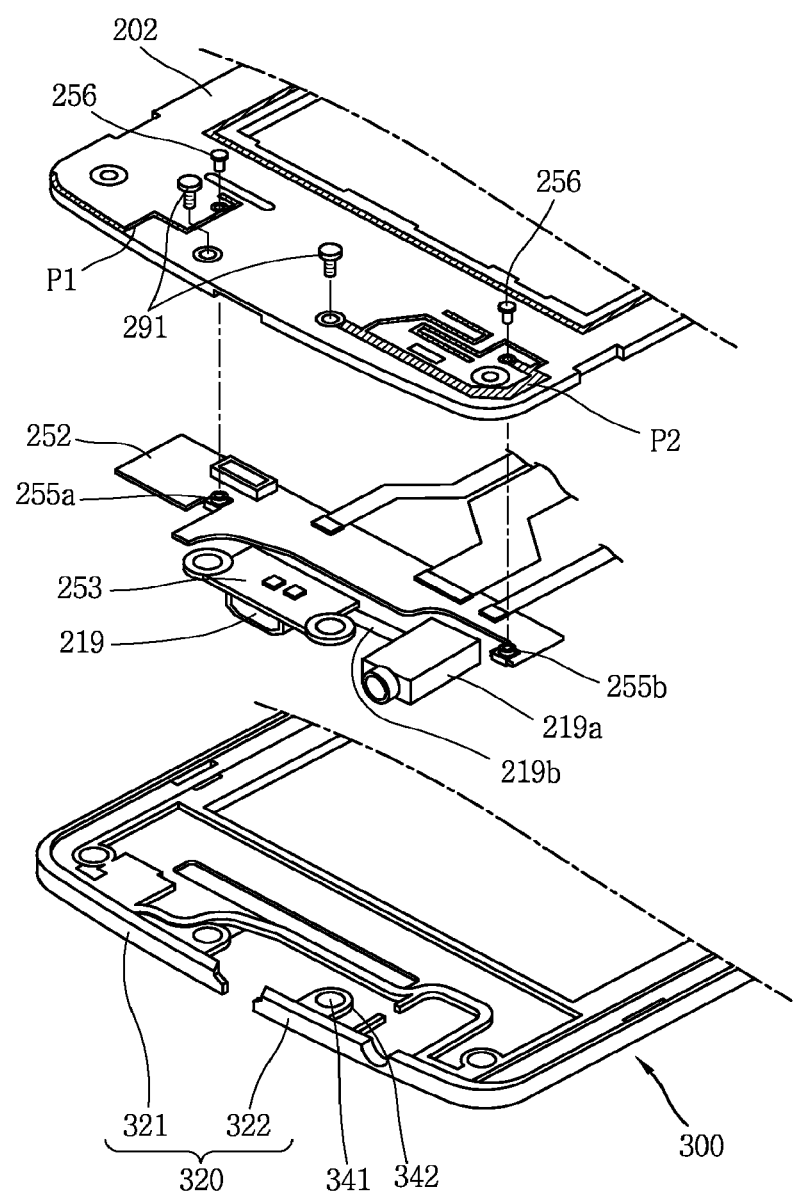
FIG. 14 is an exploded perspective view showing an embodiment of first and second antenna devices formed at the bottom of a mobile terminal according to an embodiment of the present invention.
Figure 15:
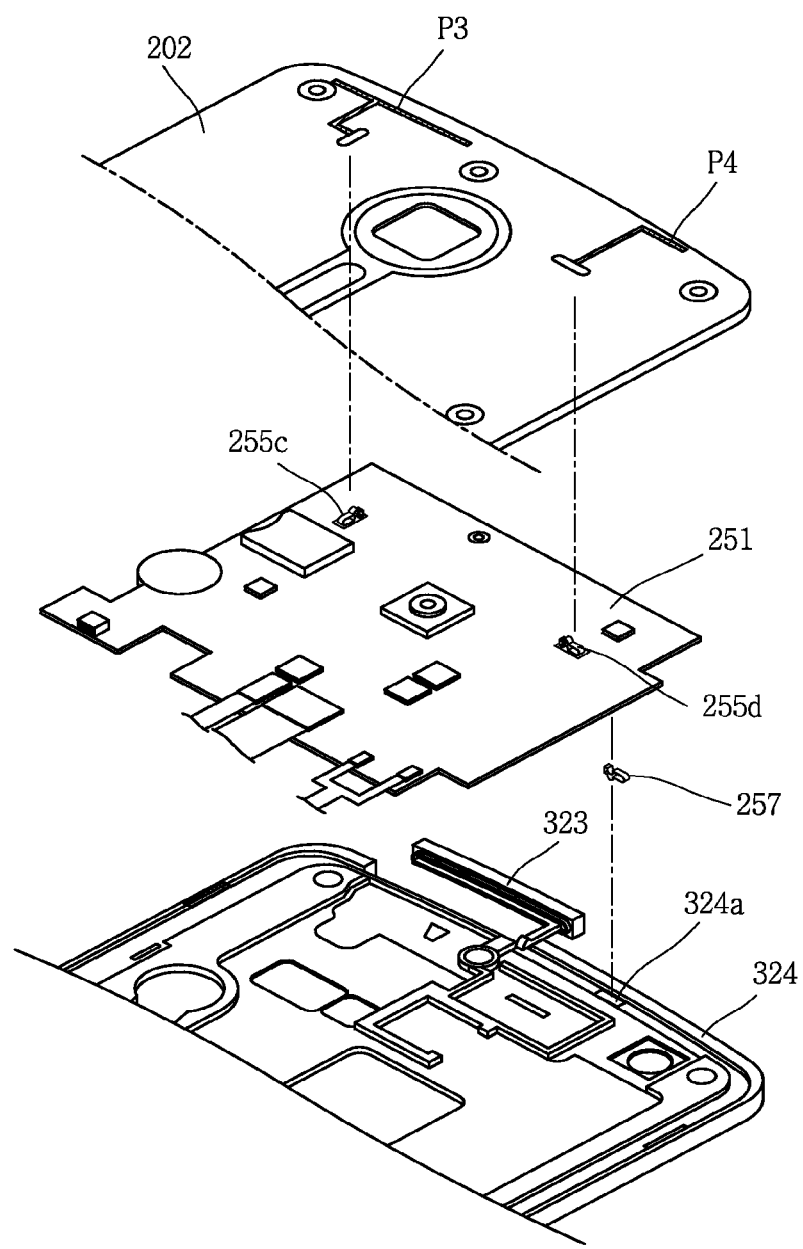
FIG. 15 is an exploded perspective view showing an embodiment of third and fourth antenna devices formed at the top of a mobile terminal according to an embodiment of the present invention.

FIG. 14 is an exploded perspective view showing an embodiment of first and and second antenna devices ANT1 and ANT2 formed at the bottom of a mobile terminal according to an embodiment of the present invention. FIG. 15 is an exploded perspective view showing an embodiment of third and fourth antenna devices ANT3 and ANT4 formed at the top of a mobile terminal according to an embodiment of the present invention.

Referring to FIG. 14, conductive members P1 and P2 constituting the first and second antenna devices may be formed on one side and the other side of the second case 202 at the bottom of the mobile terminal. The antenna devices are configured to transceive signals in different frequency bands.

For example, the first antenna device ANT1 may be configured to transceive DCN 1× type or PCS 1× type signals, and the second antenna device ANT2 may be configured to transceive DCN EVDO (Evolution-Data Optimized or Evolution-Data Only) type signals.

If the first antenna device ANT1 transceives LTE B4 type signals, the second antenna device ANT 2 may transceive LTE B13 type signals.

Alternatively, if the first antenna device ANT1 transceives signals corresponding to voice service of the mobile terminal, the second antenna device ANT2 may transceive data signals corresponding to LTE service of the mobile terminal.

The edge portion 320 may include a plurality of edge members that are configured to radiate radio signals in different frequency bands. The edge members may include a first edge member 321 and a second edge member 322. These edge members may be configured to operate in different frequency bands. The edge members may constitute a radiator, together with conductive members. These conductive members may be formed on the second case 202. The conductive members may include a first conductive member P1 that is capacitively coupled to the first edge member 321 and a second conductive member P2 that is directly connected to the second edge member 322.

Especially, in the second antenna device, the second edge member 322 formed on the metal frame 300 and the conductive member P2 formed on the second case 202 are directly connected to each other. To this end, the metal frame 300 may further include a through hole 341 and a conductive connector 342. The through hole 341 and the conductive connector 342 may be formed on the non-metal coupling portion 330 or the metal frame 300. If connected on the metal frame 300, the through hole 341 and the conductive connector 342 may form a part of the metal frame 300 which is not covered with the non-metal coupling portion 330. The through hole 341 is configured to allow for insertion of a fastening portion 291 that penetrates the second case 202. When the fastening portion 291 is inserted through the through hole 341, the second edge member 322 and the conductive member P2 are electrically connected together. The conductive connector 342 has a conductive pattern that extends from the inner periphery of the through hole 341 to the second edge member 322, and is configured to electrically connect the through hole 341 and the second edge member 322 that are spaced apart from each other.

Feeding portions 255a, 255b, 255c, and 255d are parts that supply electric electric current to each member operating as a radiator, and may be implemented through a combination of a balun, a phase shifter, a distributor, an attenuator, an amplifier, etc. The feeding portions may be formed on the circuit board, and include a feeding connector. The feeding connector may be configured to electrically connect the feeding portions with the conductive members or to feed the conductive members in an EM (Electro-Magnetic) feeding manner. The feeding connectors may include at least one of a feeding board, a feeding clip and a feeding line. FIGS. 4, 14, and 15 illustrate the feeding portions 255a, 255b, 255c, and 255d including feeding boards and feeding clips as the feeding connectors.

The feeding portions 255a and 255b for feeding the conductive members P1 and P2 are formed in the waterproof area. That is, the feeding portions are formed inside the second waterproof layer. The feeding portions 255a and 255b and the conductive members P1 and P2 are connected together by feeding pins 256 that penetrate the second case 202.

Referring to FIG. 14, the feeding portions 255a and 255b may be disposed on the back side of the metal frame, and the display 210 may be disposed on the front side of the metal frame. Since the feeding portions 255a and 255b are sensitive to electromagnetic effects, the antenna performance may be deteriorated due to the display 210 disposed on the front side of the metal frame. Accordingly, a shielding member 340 (see FIG. 8) may be formed between the display 210 and the feeding portions 255a and 255b. If the feeding portions are formed on the sub circuit board 252, the shielding member 340 may be formed between the sub circuit board 252 and the display 210.

The shielding member 340 may be made of a material such as stainless steel or an aluminum alloy.

The socket 219 and the sub circuit board 252 are interconnected by the third third flexible circuit board 254, and an earphone jack coupler 219a where an earphone jack is inserted is connected to the sub circuit board 252 by the third flexible circuit board 254. In this case, the feeding portions 255a and 255b are formed on the sub circuit board 252, so the socket 219 or the earphone jack coupler 219a also can operate as a radiator by the operation of the feeding portions. Accordingly, a mismatch portion 219b including at least one inductor or capacitor may be included in the flexible circuit board so as to prevent the socket 219 or the earphone jack coupler 219a from operating as a radiator.

The mismatch portion 219b mismatches impedance in a blocking frequency band. The impedance mismatching means that capacitors or inductors of the mismatch portion 219b are tuned so that a reflection coefficient of the antenna devices can be close to 0 dB in a blocking frequency band. As used herein, the blocking frequency band refers to a frequency band where the first or second antenna device ANT1 or ANT2 transceives radio signals.

The mismatch portion 219b may be implemented as conductive patterns on one surface of the third flexible circuit board. The conductive patterns may serve as capacitors or inductors. Alternatively, lumped parameter elements may serve as capacitors or inductors.

The mismatch portion 219b implemented through a combination of capacitors or inductors may operate as a shunt element or a series element. If the mismatch portion 219b is implemented as a shunt element, resistance, the real part of impedance, can be controlled. For instance, the inductor may have an increased resistance and the capacitor may have a decreased resistance, thereby being tuned for impedance mismatching in a blocking frequency band. If the mismatch portion 219b is implemented as a shunt element, radio signals in the blocking frequency band are transmitted to the ground.

On the other hand, if mismatch portion 219b is implemented as a series element, reactance, the imaginary part of impedance, can be controlled. For instance, the inductor may have an increased reactance, and the capacitor may have a decreased reactance, thereby being tuned for impedance matching in a blocking frequency band. If the mismatch portion 219b is implemented as a series element, radio signals in the blocking frequency band are reflected. Alternatively, the mismatch portion 219b may be implemented through a combination of a shunt element and a series element.

Referring to FIG. 15, conductive members P3 and P4 constituting the third and fourth antenna devices may be formed on one side and the other side of the second case 202 at the top of the mobile terminal. The antenna devices are configured to transceive signals in different frequency bands.

For example, the third antenna device ANT3 may be configured to transceive WIFI signals, and the second antenna device ANT4 may be configured to transceive GPS signals.

The edge portion 320 may include a plurality of edge members that are configured to radiate radio signals in different frequency bands. The edge members may include a first edge member 323 and a second edge member 324. These edge members may be configured to operate in different frequency bands. The edge members may constitute a radiator, together with conductive members extending to the edge members. These conductive members may be formed on the second case 202. The conductive members may include a third conductive member P3 that is capacitively coupled to the third edge member 323 and a fourth conductive member P4 that is directly connected to the fourth edge member 324.

A conductive connector 257 is further provided to interconnect the fourth edge edge member 324 formed on the metal frame 300 and the conductive member P4 formed on the second case 202. The conductive connector 257 is formed on the back side of the main circuit board 251. The conductive member P4 and the fourth edge member 324 are interconnected via a via hole (not shown), the feeding portion 255d, and the conductive connector 257. In this case, the conductive connector 257 may be disposed between the back side of the main circuit board 251 and a groove portion 324a formed in the fourth edge member 324.

The feeding portions 255c and 255d for feeding the conductive members P3 and P4 are formed in the waterproof area. That is, the feeding portions are formed inside the second waterproof layer. The feeding portions include feeding clips (C clips) that penetrate the second case, and the conductive members are connected together by the feeding clips.

According to the present invention, in order to reduce mutual coupling between adjacent antenna devices, one of the antenna devices adopts a direct feeding method, and the other antenna device adopts an indirect feeding method. Due to this, coupling between the antennas can be reduced.

Figure 16:
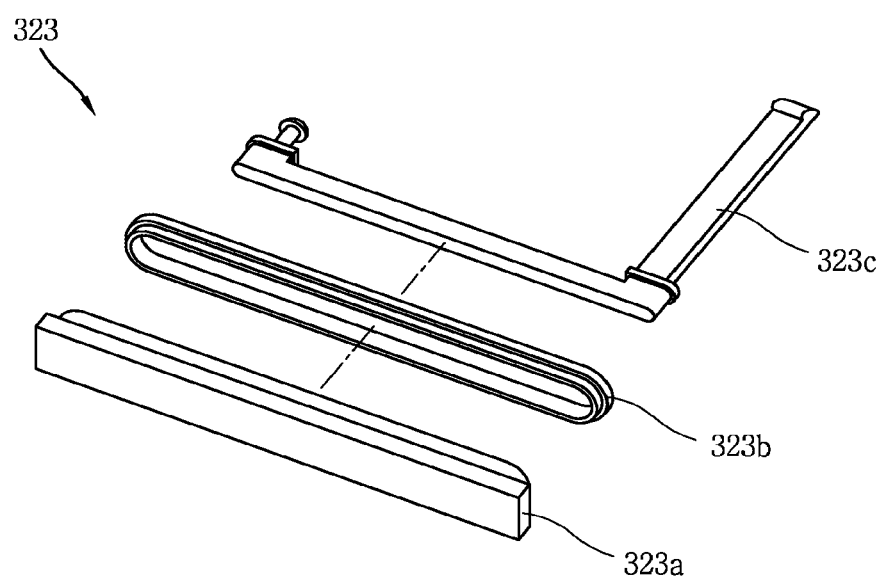
FIG. 16 is an exploded perspective view showing an example of the third edge member of FIG. 15.

FIG. 16 is an exploded perspective view showing an example of the third edge member 323 of FIG. 15.

The third edge member 323 is configured to cover another socket formed at the top of the mobile terminal. To this end, the third edge member 323 is detachably coupled to the metal frame.

The third edge member 323 includes a metal body 323a, a waterproof portion portion 323b, and a hook portion 323c. The metal body 323a is capacitively coupled to the third conductive member P3 to transceive radio signals. The waterproof portion 323b is configured to seal the inside, with the third edge member 323 bonded to the metal frame. That is, the third edge member 323 is closely attached to the metal frame while bonded to the metal frame. The hook portion 323c is configured to attach the metal body 323a to at least one of the first case 201, the second case 202, and the metal frame 300. The hook portion 323c is made of a rubber material, and elastically deformed when the third edge member 323 is detached.

What is claimed is:
1. A bar type mobile terminal, comprising:
a first cover disposed at a front side of the terminal;
a second cover disposed at a rear side of the terminal;
a display configured to display information;
a frame composed of a metal material, the frame comprising:
 a base portion corresponding to a position of the display on a front side of the frame;
 an edge portion along an outer periphery of the base portion, wherein an outer surface of the edge portion forms an appearance of the terminal body;
 a first non-metallic coupling portion formed between a first side of the edge portion and a lower outer periphery of the base portion;
 a second non-metallic coupling portion formed between a second side of the edge portion and an upper outer periphery of the base portion; and
 a first region and a second region partitioned from each other by a rib at a rear side of the frame;
a circuit board coupled to one or more electronic elements and disposed between the first region of the rear side of the frame and the second cover; and
a battery configured to supply power to the one or more electronic elements and the display, the battery disposed between the second region of the rear side of the frame and the second cover, wherein the display is disposed between the front side of the frame and the first cover, wherein at least one of sides of the edge portion of the frame is configured to emit heat generated by the one or more electronic elements or the display, wherein the first side of the edge portion comprises a first edge member and a second edge member configured to transmit or receive wireless signals at different frequency bands and are isolated from each other by a portion of the first non-metallic coupling portion, wherein the second side of the edge portion includes a third edge member and a fourth edge member configured to transmit or receive wireless signals at different frequency bands and are isolated from each other by a portion of the second non-metallic coupling portion, wherein a first slit is defined between the first edge member and the second edge member and a non-conductive material of the first non-metallic coupling portion is disposed in the first slit, wherein a second slit is defined between the third edge member and the fourth edge member and a non-conductive material of the second non-metallic coupling portion is disposed in the second slit, and wherein the first, second, third and fourth edge members are configured to operate as radiators of a plurality of antenna devices, and the plurality of antenna devices operate in a Multiple-Input Multiple-Output (MIMO) system.

2. The mobile terminal of claim 1, wherein the circuit board or at least one of the plurality of antenna devices is grounded to the frame such that a portion of the frame operates as a ground.

3. The mobile terminal of claim 1, wherein:
a plurality of transceiver circuits comprising a transmitter integrated circuit are mounted on the circuit board; and
the plurality of transceiver circuits are configured to cause operation of at least two of the plurality of antenna devices by simultaneously feeding at least two of the first, second, third, or fourth edge members.

4. The mobile terminal of claim 1, wherein:
the plurality of antenna devices comprise a first antenna device and a second antenna device;
a first feeding portion of the first antenna device is capacitively coupled to the first edge member to indirectly feed the first antenna device with electricity; and
a second feeding portion of the second antenna device is electrically coupled to the second edge member to directly feed the second antenna device with electricity.

5. The mobile terminal of claim 1, wherein:
the plurality of antenna devices comprise a third antenna device and a fourth antenna device;
a third feeding portion of the third antenna device is capacitively coupled to the third edge member to indirectly feed the third antenna device with electricity; and
a fourth feeding portion of the fourth antenna device is electrically coupled to the fourth edge member to directly feed the fourth antenna device with electricity.

6. The mobile terminal of claim 5, wherein:
the plurality of antenna devices comprise conductive members; and
one or more of the conductive member is positioned at a predetermined distance from a corresponding one or more of the first, second, third, or fourth edge members to capacitively couple to the corresponding one or more of the first, second, third, or fourth edge members.

7. The mobile terminal of claim 6, further comprising feeding portions coupled to the circuit board and corresponding feeding connectors,
wherein the feeding portions are disposed at the rear side of the frame, and
wherein each feeding connector electrically couples a corresponding feeding portion with a corresponding conductive member.

8. The mobile terminal of claim 1, wherein one of the first, second, third, or fourth edge members covers a socket formed at an upper or lower side of the mobile terminal and is detachably coupled to the frame.

9. The mobile terminal of claim 1, wherein one of the first, second, third, or fourth edge members comprises a metal body to transceive radio signals and a waterproof portion to seal inside the mobile terminal.

10. The mobile terminal of claim 1, wherein the frame further comprises a conductive connector which is not covered by the first or second non-metallic coupling portions.

11. The mobile terminal of claim 1, further comprising a thermally conductive shielding member contacting the frame and configured to shield the one or more electronic elements.

12. The mobile terminal of claim 1, wherein:
a hole is located at the frame from the front side to the rear side of the frame, and
at least one of the first or second non-metallic coupling portions passes through the hole such that a front surface is disposed at the front side of the frame and a rear surface is disposed at the rear side of the frame.

13. A bar type mobile terminal, comprising:
a first cover disposed at a front side of the terminal;
a second cover disposed at a rear side of the terminal;
a display configured to display information;
a frame composed of a metal material, the frame comprising:
a base portion corresponding to a position of the display on a front side of the frame;
an edge portion along an outer periphery of the base portion, wherein an outer surface of the edge portion forms an appearance of the terminal body;
a first hole at a lower portion of the frame and extending from the front side of the frame to a rear side of the frame;
a first non-metallic coupling portion disposed in the first hole;
a second hole at an upper portion of the frame and extending from the front side of the frame to the rear side of the frame;
a second non-metallic coupling portion disposed in the second hole; and
a first region and a second region partitioned from each other by a rib at the rear side of the frame;
a circuit board coupled to one or more electronic elements and disposed between the first region of the rear side of the frame and the second cover; and
a battery configured to supply power to the one or more electronic elements and the display, the battery disposed between the second region of the rear side of the frame and the second cover, wherein the display is disposed between the front side of the frame and the first cover, wherein at least one of sides of the edge portion of the frame is configured to emit heat generated by the one or more electronic elements or the display, wherein a first side of the edge portion comprises a first edge member and a second edge member configured to transmit or receive wireless signals at different frequency bands and are isolated from each other by a portion of the first non-metallic coupling portion, wherein a second side of the edge portion includes a third edge member and a fourth edge member configured to transmit or receive wireless signals at different frequency bands and are isolated from each other by a portion of the second non-metallic coupling portion, wherein the first and second non-metallic coupling portions pass through the corresponding first and second holes to have a corresponding front surface disposed at the front side of the frame and a corresponding rear surface disposed at the rear side of the frame, wherein a first slit is defined between the first edge member and the second edge member and a non-conductive material of the first non-metallic coupling portion is disposed in the first slit, wherein a second slit is defined between the third edge member and the fourth edge member and a non-conductive material of the second non-metallic coupling portion is disposed in the second slit, and wherein the first, second, third, or fourth edge members are configured to operate as radiators of a plurality of antenna devices, and the plurality of antenna devices are configured to operate in a Multiple-Input Multiple-Output (MIMO) system.

14. The mobile terminal of claim 13, wherein the circuit board or at least one of the plurality of antenna devices is grounded to the frame such that a portion of the frame operates as a ground.

15. The mobile terminal of claim 13, wherein:
a plurality of transceiver circuits comprising a transmitter integrated circuit are mounted on the circuit board, and
the plurality of transceiver circuits are configured to cause operation of at least two of the plurality of antenna devices by simultaneously feeding at least two of the first, second, third, or fourth edge members.

16. The mobile terminal of claim 13, wherein:
the plurality of antenna devices comprise a first antenna device and a second antenna device;
a first feeding portion of the first antenna device is capacitively coupled to the first edge member to indirectly feed the first antenna device with electricity; and
a second feeding portion of the second antenna device is electrically coupled to the second edge member to directly feed the second antenna device with electricity.

17. The mobile terminal of claim 13, wherein:
the plurality of antenna devices comprise a third antenna device and a fourth antenna device;
a third feeding portion of the third antenna device is capacitively coupled to the third edge member to indirectly feed the third antenna device with electricity; and
a fourth feeding portion of the fourth antenna device is electrically coupled to the fourth edge member to directly feed the fourth antenna device with electricity.

18. The mobile terminal of claim 17, wherein:
the plurality of antenna devices comprise conductive members; and
one or more of the conductive members is positioned at a predetermined distance from a corresponding one or more of the first, second, third, or fourth edge members to capacitively couple to the corresponding one or more of the first, second, third, or fourth edge members.

19. The mobile terminal of claim 18, further comprising feeding portions coupled to the circuit board and corresponding feeding connectors,
wherein the feeding portions are disposed at the rear side of the frame, and
wherein each feeding connector electrically couples a corresponding feeding portion with a corresponding conductive member.

20. The mobile terminal of claim 13, wherein one of the first, second, third, or fourth edge members covers a socket formed at an upper or lower side of the mobile terminal and is detachably coupled to the frame.

21. The mobile terminal of claim 13, wherein one of the first, second, third, or fourth edge members comprises a metal body to transceive radio signals and a waterproof portion to seal inside the mobile terminal.

22. The mobile terminal of claim 13, wherein the frame further comprises a conductive connector which is not covered by the first or second non-metallic coupling portions.

23. The mobile terminal of claim 13, further comprising a thermally conductive shielding member contacting the frame and configured to shield the one or more electronic elements.

24. A bar type mobile terminal, comprising:
a frame composed of a metal material, the frame comprising:
a base portion disposed at a front side of the frame;
an edge portion along an outer periphery of the base portion; wherein an outer surfaces of the edge portion form an appearance of the terminal body;
a first hole at a lower portion of the frame;
a first non-metallic coupling portion disposed in the first hole;
a second hole at an upper portion of the frame,
a second non-metallic coupling portion disposed in the second hole; and
a circuit board coupled to one or more electronic elements and disposed at a rear side of the frame,
wherein a first side of the edge portion comprises a first edge member and a second edge member configured to transmit or receive wireless signals at different frequency bands and are isolated from each other by a portion of the first non-metallic coupling portion,
wherein a second side of the edge portion comprises a third edge member and a fourth edge member configured to transmit or receive wireless signals at different frequency bands and are isolated from each other by a portion of the second non-metallic coupling portion,
wherein the first, second, third, or fourth edge members are configured to operate as radiators of a plurality of antenna devices,
wherein the circuit board or at least one of the plurality of antenna devices is grounded to the frame such that a portion of the frame operates as a ground,
wherein a first slit is defined between the first edge member and the second edge member, and a non-conductive material of the first non-metallic coupling portion is disposed in the first slit, and
wherein a second slit is defined between the third edge member and the fourth edge member, and a non-conductive material of the second non-metallic coupling portion is disposed in the second slit.

25. The mobile terminal of claim 24, wherein the plurality of antenna devices are configured to operate in a Multiple-Input Multiple-Output (MIMO) system in LTE frequency bands.

26. The mobile terminal of claim 24, wherein:
a plurality of transceiver circuits comprising a transmitter integrated circuit are mounted on the circuit board; and
the plurality of transceiver circuits are configured to cause operation of at least two of the plurality of antenna devices by simultaneously feeding at least two of the first, second, third, or fourth edge members.

27. The mobile terminal of claim 24, wherein:
the plurality of antenna devices comprise a first antenna device and a second antenna device;
a first feeding portion of the first antenna device is capacitively coupled to the first edge member to indirectly feed the first antenna device with electricity; and
a second feeding portion of the second antenna device is electrically coupled to the second edge member to directly feed the second antenna device with electricity.

28. The mobile terminal of claim 24, wherein:
the plurality of antenna devices comprise a third antenna device and a fourth antenna device;
a third feeding portion of the third antenna device is capacitively coupled to the third edge member to indirectly feed the third antenna device with electricity; and
a fourth feeding portion of the fourth antenna device is electrically coupled to the fourth edge member to directly feed the fourth antenna device with electricity.

29. The mobile terminal of claim 28, wherein:
the plurality of antenna devices comprise conductive members; and
one or more of the conductive members is positioned at a predetermined distance from a corresponding one or more of the first, second, third, or fourth edge members to capacitively couple to the corresponding one or more of the first, second, third, or fourth edge members.

30. The mobile terminal of claim 29, further comprising feeding portions coupled to the circuit board and corresponding feeding connectors,
wherein the feeding portions are disposed at the rear side of the frame, and
wherein each feeding connector electrically couples a corresponding feeding portions with a corresponding conductive member.

* * * * *